United States Patent [19]

Hommes et al.

[11] Patent Number: 4,853,602
[45] Date of Patent: Aug. 1, 1989

[54] SYSTEM FOR USING SYNCHRONOUS SECONDARIES OF A LINEAR MOTOR TO BIAXIALLY DRAW PLASTIC FILMS

[75] Inventors: William J. Hommes, Hockessin; John J. Keegan, Jr., Wilmington, both of Del.

[73] Assignee: E. I. Dupont de Nemours and Company, Wilmington, Del.

[21] Appl. No.: 194,952

[22] Filed: May 17, 1988

Related U.S. Application Data

[63] Continuation-in-part of Ser. No. 57,563, Jun. 15, 1987, abandoned, which is a continuation-in-part of Ser. No. 813,311, Dec. 24, 1985, Pat. No. 4,675,582.

[51] Int. Cl.$^4$ ............................................. H02K 41/00
[52] U.S. Cl. ....................................... 318/38; 318/135; 310/12
[58] Field of Search ............... 310/12, 13, 14; 318/38, 318/135

[56] References Cited

U.S. PATENT DOCUMENTS

| | | | |
|---|---|---|---|
| 3,088,173 | 5/1963 | Jones | 18/48 |
| 3,248,753 | 5/1966 | Kobayashi et al. | 18/1 |
| 3,502,766 | 3/1970 | Tsuruta et al. | 264/289 |
| 3,786,127 | 1/1974 | Peet et al. | 264/288 |
| 3,803,466 | 4/1974 | Starkey | 318/135 |
| 3,890,421 | 6/1975 | Habozit | 264/289 |
| 3,904,941 | 9/1975 | Matsui | 318/135 |
| 4,081,723 | 3/1978 | Vetter et al. | 318/38 |
| 4,234,532 | 11/1980 | Motegi | 264/235.8 |
| 4,259,620 | 3/1981 | Oates et al. | 318/802 |
| 4,354,997 | 10/1982 | Mizutani et al. | 264/560 |
| 4,370,291 | 1/1983 | Kazama et al. | 264/210.7 |
| 4,428,723 | 1/1984 | Thiel | 425/324.1 |
| 4,525,317 | 6/1985 | Okada et al. | 264/290.2 |
| 4,625,372 | 12/1986 | Hufnagel et al. | 264/290.2 |

FOREIGN PATENT DOCUMENTS

2317076 2/1977 France .
48-38779 10/1973 Japan .

Primary Examiner—Patrick R. Salce
Assistant Examiner—Judson H. Jones

[57] ABSTRACT

A system useful for controlling multiple secondaries of a linear disposed motor along an elongated path, with the system having a linear synchronous motor with its elongated primary disposed along the elongated path and at least one secondary responsive to the primary with means disposed thereon for attachment to a body to be propelled along the path, a plurality of linear synchronous motor drivers for providing inputs to designated coil windings of the primary for developing a traveling electromagnetic wave along the primary, a driver controller means connected to each motor driver which has plurality of memory sections for storing therein characteristics of waveforms for use in the system of the invention, a central controller for controlling the output of the plurality of driver controller means and a system computer for down loading instructions for the various waveform patterns to the memories of the driver controller means and for overall supervisory control of the system of the invention. The system is particularly useful for continuously drawing a web of material by attaching the synchronous secondaries to carriages having tenter clips attached; the tenter clips clipped to the outer edges of the film serve to carry the film through stretching and stabilizing zones to provide a novel film, particularly a novel biaxially oriented polyethylene terephthalate film.

26 Claims, 17 Drawing Sheets

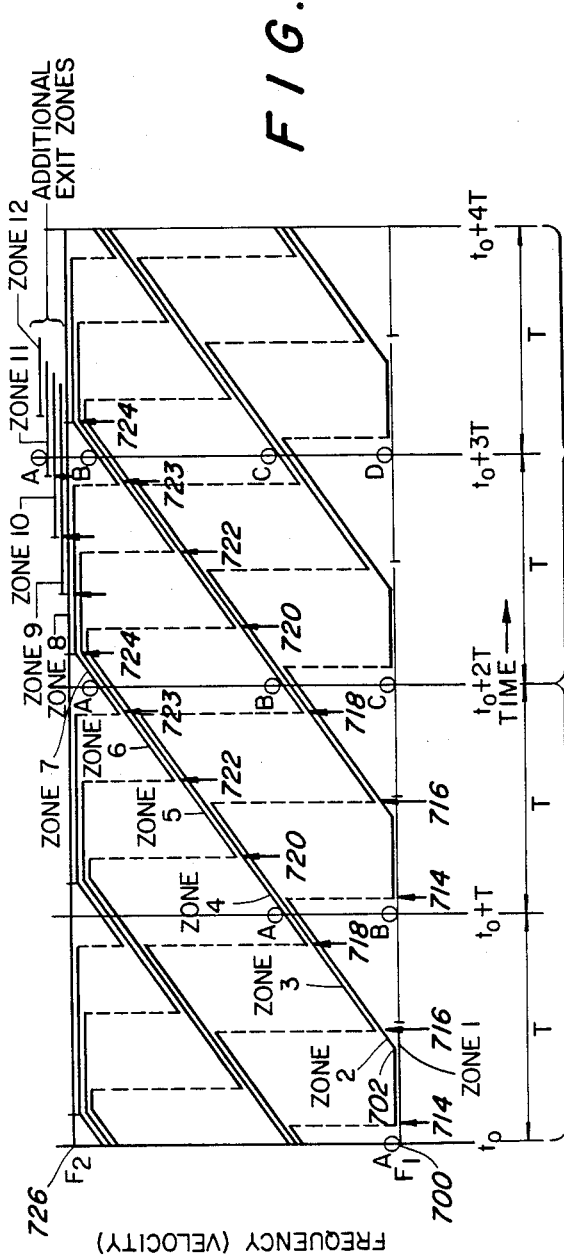

| ZONE DRIVER GATING LOGIC TABLE | | | | | | | | | | |
|---|---|---|---|---|---|---|---|---|---|---|
| LOGIC STATE | INPUTS | | | | OUTPUTS | | | | | |
| | A | B | C | OT | A | $\bar{A}$ | B | $\bar{B}$ | C | $\bar{C}$ |
| OUTPUTS OFF | 0 | 0 | 0 | – | 0 | 0 | 0 | 0 | 0 | 0 |
| 0° - 60° | 1 | 0 | 1 | 1 | 1 | 0 | 0 | 1 | 1 | 0 |
| 60° -120° | 1 | 0 | 0 | 1 | 1 | 0 | 0 | 1 | 0 | 1 |
| 120° -180° | 1 | 1 | 0 | 1 | 1 | 0 | 1 | 0 | 0 | 1 |
| 180° -240° | 0 | 1 | 0 | 1 | 0 | 1 | 1 | 0 | 0 | 1 |
| 240° -300° | 0 | 1 | 1 | 1 | 0 | 1 | 1 | 0 | 1 | 0 |
| 300° -360° | 0 | 0 | 1 | 1 | 0 | 1 | 0 | 1 | 1 | 0 |
| OUTPUT FAULT | – | – | – | | 0 | 0 | 0 | 0 | 0 | 0 |

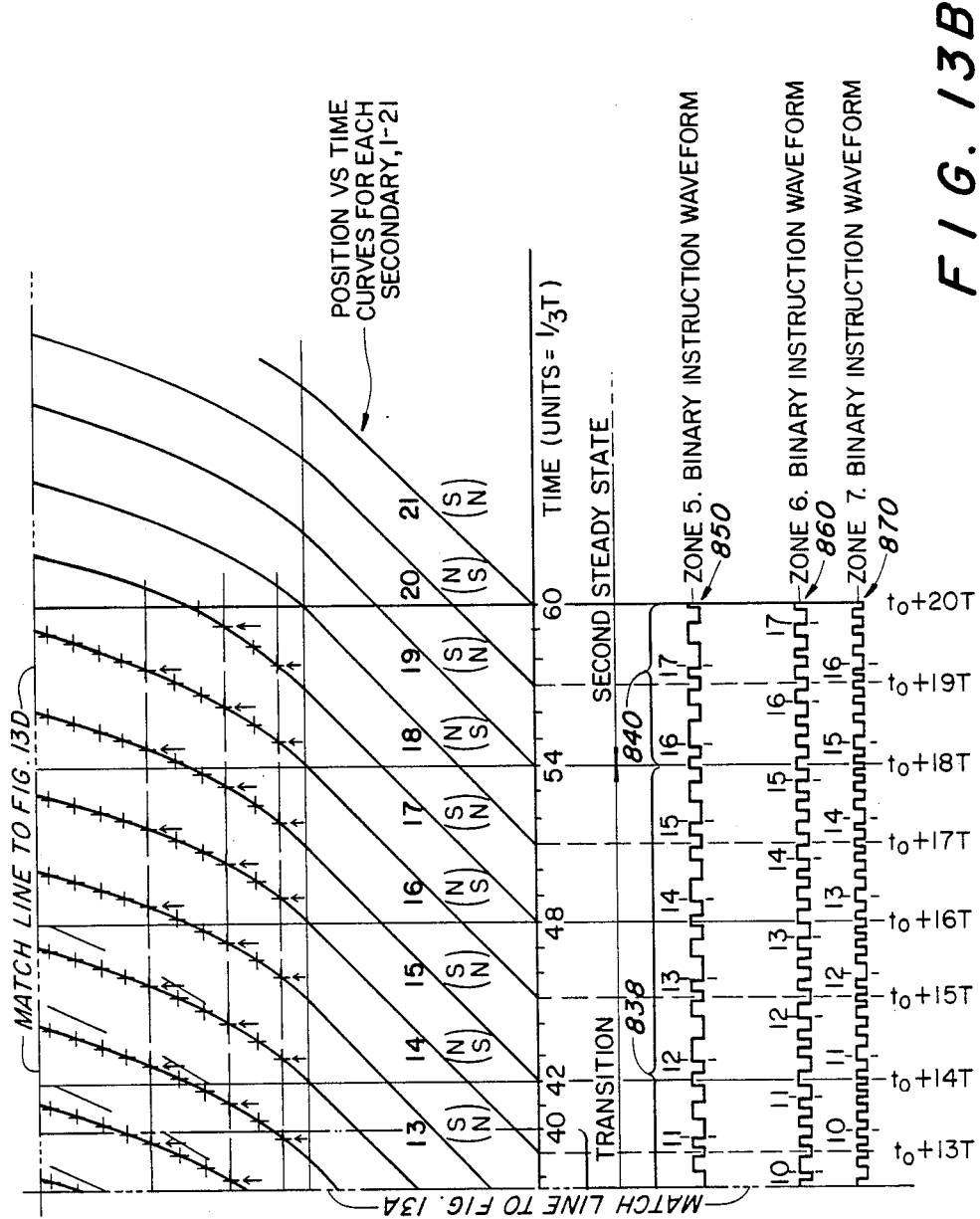

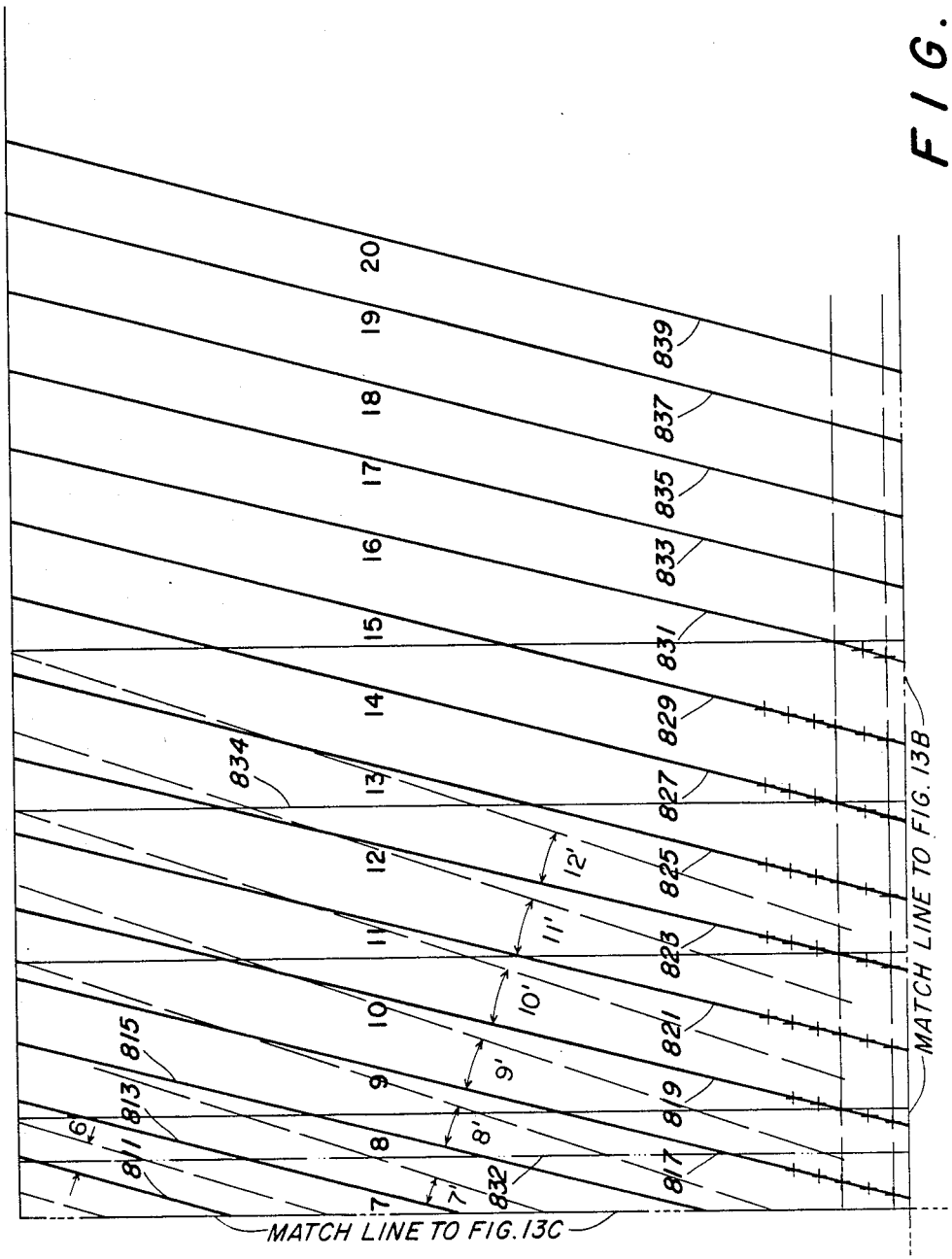

SYSTEM FOR USING SYNCHRONOUS SECONDARIES OF A LINEAR MOTOR TO BIAXIALLY DRAW PLASTIC FILMS

CROSS REFERENCE TO RELATED APPLICATIONS

This application is a continuation-in-part of copending application Ser. No. 057,563, filed June 15, 1987, which in turn, is a continuation-in-part of application Ser. No. 813,311, filed Dec. 24, 1985 now U.S. Pat. No. 4,675,582.

TECHNICAL FIELD

The present invention relates to the field of systems useful for controlling the velocity, and spacing of multiple secondaries traveling along the primary of a linear synchronous motor disposed along an elongated path. More specifically, the present invention relates to a system for and method of controlling the velocity and relative spacing of multiple secondaries of a linear synchronous motor which are propelled along an elongated fixed primary in which the primary is divided into a plurality of zones that are independently powered and controlled.

BACKGROUND ART

Linear synchronous motors (hereinafter "LSM") are well known and have been successfully used for moving vehicles along an elongated path. Laithwaite, *Proceedings of the IEEE*, "Linear-Motion Electrical Machines," Vol. 58, No. 4, April 1970. In order for a LSM to operate properly, the secondaries, which move along the fixed primary, have salient spaced apart magnetic poles whose fields synchronize with, or "lock" onto, the traveling electromagnetic (hereinafter "EM") wave developed in the primary. Therefore, when the field of a secondary is synchronized with the EM wave, such secondary will move along the primary at the velocity of the EM wave.

The EM wave has characteristics of velocity, polarity and pole pitch. The EM wave is developed in the primary by powering spaced coils of the primary by a multiple phase alternating current (hereinafter "AC") or power waveform. The velocity of any specific secondary propelled along the primary by an EM wave developed in the primary is determined by the following expression:

$$U = 2\lambda f$$

where, "$\lambda$", in accordance with electric motor manufacture nomenclature, is the pole pitch between two adjacent poles of the EM wave, and "$f$" is the frequency of the AC waveform powering the EM wave. In the above expression, $\lambda$ equals the distance per $\frac{1}{2}$ the cycle of the EM wave. So, the EM wave travels one pole pitch for every $\frac{1}{2}$ of an AC cycle of the power waveform. Since the pole pitch is fixed in the winding pattern in the primary, the pole pitch and pole spacing of the secondaries are matched to that of the fixed primary for any given LSM system. Therefore, by varying the frequency of the power waveform, the velocity of the EM wave is varied and, likewise, so is the velocity of the secondaries "locked" onto the EM wave.

Loss of synchronism between a particular secondary and the traveling EM wave is a problem in LSM systems. This loss of synchronism prevents accurate speed and position control of the secondary, and in the extreme case can cause the secondary to stop. Loss of synchronism can occur because of excessive loading on the secondary due to external loads and forces developed in accelerating (either positively or negatively) the secondary with the EM wave. Loss of synchronism can also occur when independently controlled adjacent zones along the primary are not properly coordinated so that the EM waveform developed in each zone is matched at the interface between such adjacent zones.

The effect of loss of synchronism varies with the type of LSM system. In an LSM system in which the vehicle attached to a secondary has a high mass and is traveling at high speed, the inertia is large compared to the propulsion force. Loss of synchronism in this type of system is not severe and can be corrected during operation by, for example, feedback circuitry. This type of LSM system is more forgiving in that if loss of synchronism occurs, the secondary will continue along the path because of the large amount of inertia associated with it and there is ample amount of time for the EM wave to be adjusted by the feedback circuitry to match the new velocity of the secondary and after such adjustment the secondary will again "lock" onto the EM wave. However, accurate knowledge of the position of the secondary propelled by the EM wave may be lost.

In LSM systems in which the vehicle attached to the secondary has a low mass and travels at a low speed, the inertia is low compared to the propulsion force. In such systems, loss of synchronism can be severe and cause the vehicle attached to the secondary to oscillate or come to a stop. This type of system is unforgiving and adjustment of the EM wave through feedback circuitry would not normally be successful because the feedback adjustment procedure would not have sufficient time to adjust the EM wave before the secondary will have come to a stop.

These two systems are at the extremes of the effect on LSM systems of the loss of synchronism between a secondary and the EM wave. All other systems, such as high inertia-high force or low inertia-low force systems, when experiencing loss of synchronism, will react somewhere in between the two. So, it is very critical in all LSM systems, which are very unforgiving, to ensure that loss of synchronism does not occur because it may result in total shut down of the system.

In a LSM system which has multiple zones in which each specific zone is independently powered to develop an EM wave, there is a problem in maintaining precise control in powering the primary to match the power waveform and, therefore, the EM wave at the interface between adjacent zones. As a secondary crosses the interface, or is "handed off", between two independently controlled zones, the EM wave developed for each zone for a period of time propels this same secondary. The magnetic pole velocity and polarity of the traveling EM wave developed independently in the adjacent zones must match each other during "hand-off" or synchronism between the EM wave and the secondary will be lost. The mismatch will exist if either the frequency or phase of the two power waveforms, which develop the EM wave independently in each adjacent zone, are not the same at their interface.

In situations when the independently controlled adjacent zones propel the secondary at a constant velocity or increase or decrease the velocity of the secondary, matching of the power waveforms of adjacent zones during hand off at the interface is a problem.

A prior art method used for effecting the "hand-off" of a secondary from one zone to another, is described in U.S. Pat. No. 3,803,466 (hereinafter "the '466 patent"). In the system of the '466 patent, transition from one zone to another in which acceleration of the secondary is contemplated, is achieved in the following manner. As rotors (secondaries) approach the end of, for example, a constant speed zone, the frequency and phase of the power waveform produced in the stator (primary) in the subsequent, adjacent acceleration zone is adjusted to match that of the constant speed zone via feedback circuitry. As the rotors transition from the constant speed zone to the acceleration zone, the powering waveform has the same phase and constant frequency in both zones. Once the rotor has completely moved into the acceleration zone, a switch is tripped by the rotor that causes the frequency of the power waveform in the acceleration zone to increase. To transition to the next constant speed zone having a higher velocity, or to a second acceleration zone, it is necessary to achieve a constant frequency and phase match at "hand-off" between the two adjacent zones, as previously described. This type of system requires time to achieve synchronism, and substantial amounts of feedback circuitry and sensing to ensure the frequency and phase are properly matched when the rotor is "handed-off" from the constant speed zone to the acceleration zone, or from the acceleration zone to a constant high speed zone, or from one acceleration zone to another.

The present invention provides a system and method that overcomes the limitations and disadvantages of prior art systems as will be described.

SUMMARY OF THE INVENTION

It is found that the aforementioned problems can be substantially overcome by the present invention, which is particularly pointed out in the appended claims and illustrated in the preferred embodiments in the accompanying drawings.

BRIEF DESCRIPTION OF THE DRAWINGS

FIG. 6 shows a logic truth table for the RAM select logic of the zone controller shown in FIG. 5.

FIG. 7 shows the logic truth table of outputs from the central controller to the RAM select logic versus the logic states of the RAM select logic of the zone controller of FIG. 5.

FIG. 12 shows a graphical representation of a composite frequency slope up for acceleration of secondaries from a first constant velocity to a second constant velocity.

FIG. 13A-13D show a graphical representation of the position of secondaries along the primary in phase angle versus time for two representative steady-state conditions and a representative transition state condition.

DESCRIPTION OF THE PREFERRED EMBODIMENTS

Figure 1:
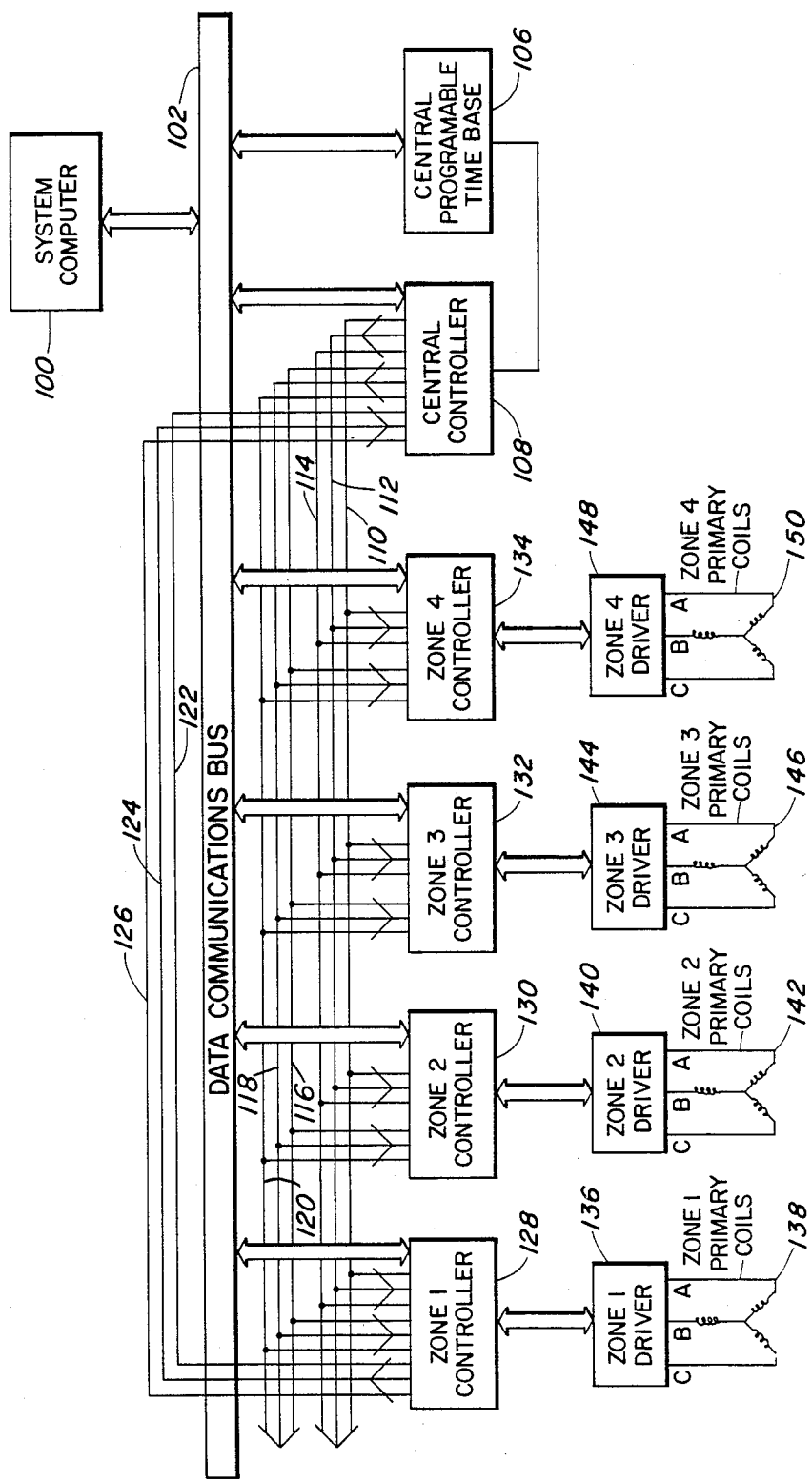
FIG. 1 shows a block diagram of a representative portion of the system of the invention.

FIG. 1 shows a block diagram of a representative portion of the system of the invention. The system of the present invention has a variety of uses. In addition to the uses of an LSM mentioned in the Laithwaite article and the '466 patent, the apparatus and method of the present invention may be useful in a variety of other applications, such as, but not limited to: (1) propelling individual, linear motor powered, railway vehicles (U.S. Pat. Nos. 3,158,765; 4,061,089; and 4,454,457); (2) propelling separate gripper carriages in parallel tracks (U.S. Pat. No. 3,081,723); (3) individually accelerated or decelerated material handling conveyors or the like (U.S. Pat. Nos. 2,831,131; 4,530,428; and 4,533,073); (4) stretching wool fleece and other similar materials (U.S. Pat. No. 4,406,038); and (5) biaxially drawing plastic films (U.S. Pat. No. 3,890,421; Japanese patent publication No. 48-38779).

The system as shown in FIG. 1 has system computer 100, central programmable timebase 106, central controller 108, and a plurality of independent zone drive means. In the portion of the system shown, the independent zone drive means for powering the primary coil windings represented by coil windings 138, 142, 146 and 150, are zone drivers, such as drivers 136, 140, 144 and 148, and zone controllers, such as zone controllers 128, 130, 132 and 134, each of which is connected to the respective zone driver associated therewith. In the system, central controller 108 is connected to each of the zone controllers; central programmable timebase 106 is connected to central controller 108 and provides timing signals to the zone controllers through central controller 108; and system computer 100 is connected to central programmable timebase 106, central controller 108 and zone controllers 128, 130, 132 and 134 via data communication bus 102. A system so configured is meant to operate in a plurality of steady states and a transition state for transitioning between steady states.

It is also contemplated that the system of the invention can be operated in a single steady state. When the system is so configured, the system includes all of the elements of the system described above except for system computer 100 and central controller 108. Central programmable timebase 106 is connected to each of the zone controllers and provides timing signals to the zone controllers for controlling their respective outputs. The zone controllers in this embodiment have only one memory which contains the instructions for one steady state.

System computer 100 is a commercially available computer, such as HP 1000/A900 available from Hewlett-Packard Company, Palo Alto, Calif. System computer 100 provides overall supervisory control of the system of the invention. Computer is connected to data communication bus 102 and provides, among other things, control information for initiating changes in the steady-state operation of the system. Computer 100 also down loads information to the three memories of all zone controllers for storage therein. This information is for development of three distinct power waveform patterns as will be described subsequently.

Central controller 108 is a logic circuit used for controlling the state in which the system operates. The states of operation of the system of the invention are a first steady-state, a second steady-state, and a transition state for transitioning from the first to the second steady-state. The output signals from the central controller 108 determine which memory of the zone controller is selected to develop the power waveform for powering the primary coil winding of a specific zone. It also provides the timebase signals from central programmable timebase 106 for causing accessing of a selected memory for output of the binary instructions contained therein from the zone controller to the zone driver. Central controller 108 is in two-way communication with data communication bus 102 for both sending and receiving information from computer 100.

Central programmable timebase 106 provides a constant frequency pulse waveform to central controller 108 which in turn provides this timebase or a sub-multiple signal to each zone controller. The signal provided by timebase 106 is a common timebase signal used to pace the output of the zone controllers. Central programmable timebase 106 can have its output pulse rate changed to different desired values by commands received from system computer 100, as a result of operator input. This permits the speed of the secondaries to be scaled up or down without changing the velocity ratio and relative spacing between secondaries. Central programmable timebase 106 is a commercially available apparatus, such as HP 3326A, Programmable Function Generator available from Hewlett-Packard Company, Palo Alto, Calif.

Zone controllers 128, 130, 132 and 134 are representative of all zone controllers of the system of the invention. As will be discussed in greater detail in discussing FIG. 5, these controllers are used for storing the binary instructions of the characteristics of the power waveforms for developing the EM wave for a specific zone of the primary to which it is attached through a particular zone driver.

Zone drivers 136, 140, 144 and 148 operate in conjunction with the above discussed zone controllers to which each driver is attached. As will be described in greater detail in discussing FIG. 9, each zone driver receives a three phase AC input from an external source which is then rectified and filtered to produce a source of DC power. The DC power is applied across pairs of power transistor switches which are switched to produce a frequency and phase adjustable AC output in the primary. Taking for example zone driver 136, it receives digital input signals from attached zone controller 128. The digital input signals are input to a gating logic circuit of zone driver 136 whose output causes switching of the power transistor switch pairs to produce, for example, a six step type output for powering the windings of the primary for developing a traveling EM wave. Zone drivers, such as zone driver 136, are commercially available, such as Model No. 1340-FAA from Allen-Bradley Co., Milwaukee, Wis. These commercially available drivers are modified with the above mentioned gating logic circuit for switching of the power transistor switches and a voltage control circuit, as will be described subsequently.

Coil winding 138, 142, 146 and 150 of the primary represent the specific coil windings of zones which are powered by a particular zone drive means comprising a zone controller and zone driver. These coil windings are powered in such a manner that a traveling magnetic wave is produced in that zone. This will be described in more detail with reference to FIGS. 2 and 3.

Figure 2:
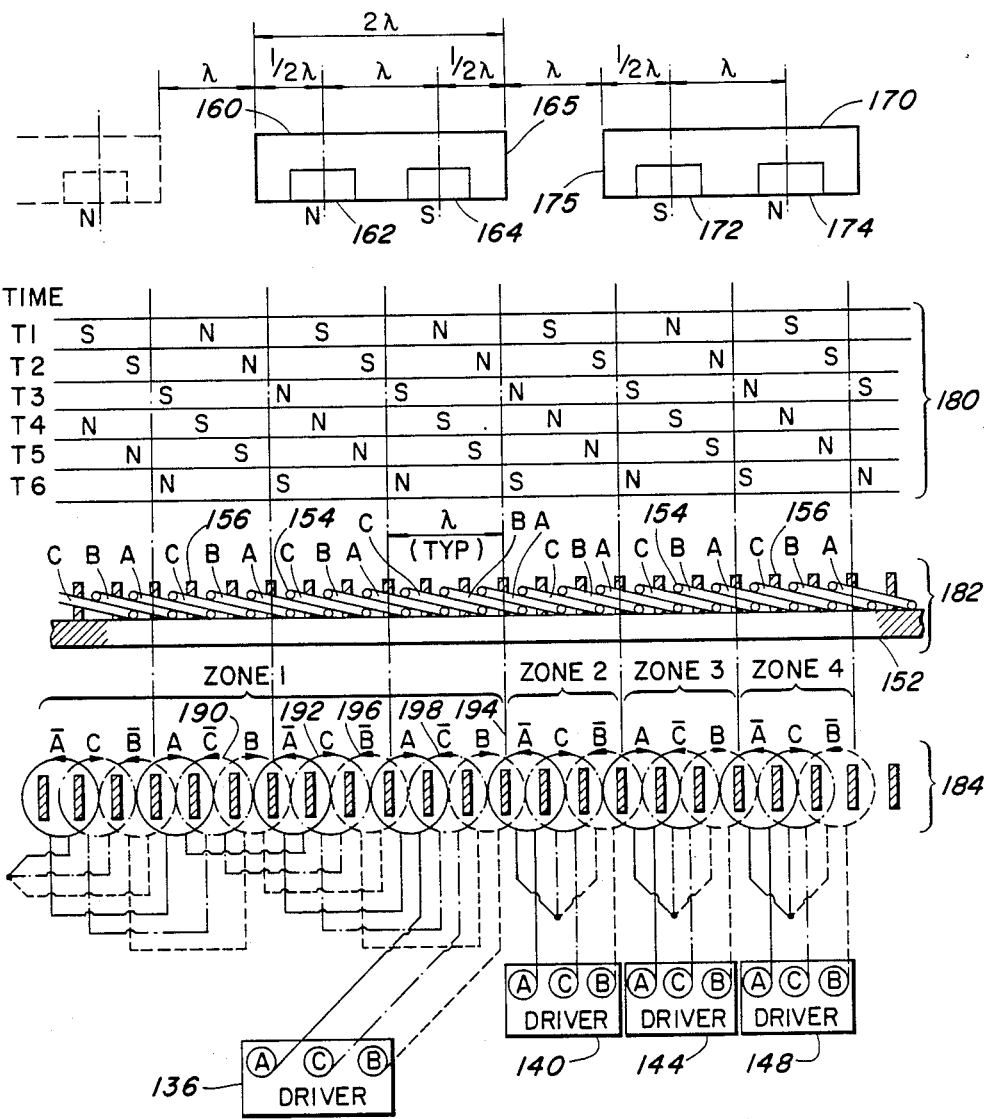
FIG. 2 shows a representative view of the primary and two secondaries of the LSM used in the system of the invention together with four representative zone drivers, and the primary output polarities developed in the primary for propelling the secondaries through the four zones.

Referring to FIG. 2, primary 152 and secondaries 160 and 170, are typical of a short secondary type LSM. Primary 152, shown at 182, is a cross-sectional view of a portion of an elongated primary. At 184, four independently powered discrete contiguous zones are shown. Zone 1 is a constant velocity zone while Zones 2, 3 and 4 are acceleration zones in the acceleration section of primary 152. Primary 152 has slots 154 for disposing therein $\phi A$, $\phi B$ and $\phi C$ coil windings. Disposed between adjacent slots 154 are motor lamination teeth 156 for completion of the magnetic flux path for developing the traveling EM wave. The flux path is created in a conventional manner typical of LSMs, and would be understood by one skilled in the art, and, therefore, does not need further explanation. In the representative example, the coil windings of the primary are 2/3 chorded.

In the example shown in FIG. 2, the frequency of the three-phase power waveform developed in the primary is constant in constant velocity Zone 1, as well as in acceleration Zones 2, 3 and 4. However, it is understood that the three-phase power waveform used to power the primary coil windings of an acceleration zone can have a frequency that varies with time to achieve frequency sloping of the power waveform to increase or decrease the velocity of a secondary being propelled in such an acceleration zone "locked" onto the traveling EM wave developed in the primary by the power waveform.

One of the novel features of the system of the invention is that each zone, such as Zones 1, 2, 3 and 4, is independently controlled by a zone drive means comprising a zone driver and a zone controller (not shown in FIG. 2). Each zone driver is coordinated with the independently controlled zone drivers of adjacent zones so the secondary experiences a continuous traveling EM wave along the entire length of elongated primary 152. The velocity and polarity of the traveling EM wave is momentarily matched at the interface between two independently powered zones during "hand-off" by matching the frequency and phase of their power waveforms. This is done without the need of feedback circuitry as disclosed in the prior art.

Referring to FIG. 2 at 180, a position versus polarity graph is shown for six different times associated with the developed EM wave. Shown at 182, as previously stated, is a cross-sectional view of the coils and teeth of the primary. At 184, a top view of the teeth and coils shown at 182 is shown with the direction of positive current flow in the coils indicated. The coils which are disposed in slots 154 are shown, for example, as A and $\overline{A}$. The bar designation over a specific letter merely indicates the direction of positive current flow in that coil is reversed from that in a coil not having the bar designation over it.

Secondaries, such as secondaries 160 and 35 170, are propelled along primary 152 by the traveling EM wave developed by the coil windings. These secondaries are preferably mounted on a monorail for movement along the primary. There is a conventional air gap between the primary and secondaries when the secondaries are mounted on the monorail. Secondary 160 has conventional permanent magnets 162 and 164 disposed in the bottom surface. These magnets provide opposing polarities at the bottom surface of the secondary adjacent to, but spaced away from, primary 152. Magnetic poles 162 and 164 are separated by a distance of one pole pitch or "$\lambda$", thereby, matching the fixed pole pitch of the primary. Adjacent secondaries, such as secondary 160 and 170, have the disposition of their magnets reversed. For example, secondary 160 has magnet 162 which is a North pole followed by magnet 164 which is a South pole, while adjacent secondary 170 has magnet 172 which is a South pole followed by magnet 174 which is a North pole. Adjacent secondaries have their poles reversed to allow for the closest disposition in a common zone of adjacent secondaries, which is a 1$\lambda$ separation between the magnetic edges of adjacent secondaries. However, the magnets can be disposed in a repeating pattern in adjacent secondaries, such as North/South - North/South. If the magnets are disposed in this manner, the minimum separation between the magnetic edges of adjacent secondaries must be 2$\lambda$.

Figure 3:
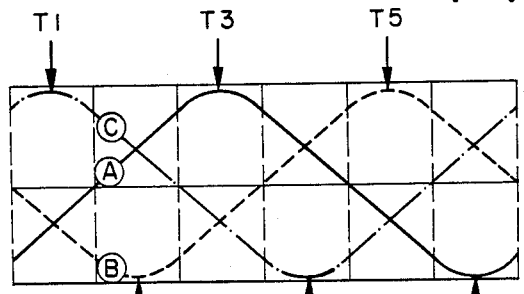
FIG. 3 shows a three-phase AC waveform used for describing the development of the traveling EM wave in the primary of the LSM shown in FIG. 2.

In the development of the traveling EM wave, taking for example the instant of time T1 in FIG. 3, the current flow in the C-phase coils is at the maximum positive value. Therefore, at 184 in Zone 1, the current flow in the C-phase coils 190 and 198 is in the counterclockwise direction, and clockwise in the C-phase coil 192. This will mean that at 182, by the well known "right hand rule", a North pole is produced by coils 190 and 198 and a South pole by coil 192 in Zone 1. As indicated at 180 along line T1, the South pole over C-phase coil 192 of Zone 1 engages the North pole of magnet 162 of secondary 160, and the North pole over C-phase coil 198 of Zone 1 engages the South pole of magnet 164.

Zone drivers 136, 140, 144 and 148 for Zones 1, 2, 3 and 4, respectively, all develop power waveforms which match momentarily at the interfaces between zones along the length of primary 152. For example, the last C-phase coil of Zone 1 has its positive direction of current flow in the counterclockwise direction producing a North pole; the C-phase coil of Zone 2 has its positive direction of current flow in the clockwise direction producing a South pole; the C-phase coil of Zone 3 has its positive direction of current flow in the counterclockwise direction producing a North pole; while the C-phase coil of Zone 3 has its positive direction of current flow in the clockwise direction producing a South pole. This disposition of C, $\overline{C}$ is repeated throughout the length of the primary for the C-phase coils.

This is also true for the A-phase and B-phase coils. In this manner, the North and South poles along primary 152 are developed for engaging the magnets and propelling secondaries 160 and 170. Also, since there is a distance of 2$\lambda$ between the closest pole centerlines of adjacent secondaries, secondary 170 can be accelerated independent of secondary 160. This is because each secondary being accelerated will always be in a different zone at any given instant of time, therefore being subjected to the separate frequency slope of the power waveform of the zone or zones it is being propelled through.

Now taking instant of time T2, the next current peaking coil for developing the traveling EM wave for propelling the secondaries is the B-phase coil. As seen in FIG. 3, at time T2, the current flow in the B-phase coil is at a maximum negative value. As such, the current will flow in a direction opposite that indicated by arrow of coil 196. Noting this, there are alternating polarities for the B-phase coils following line T2 for Zones 1-4 in the same manner as previously described for the C-phase coils. In the shift from time T1 to T2, B-phase coil 196 changes from a North pole to a South pole. This will propel the North pole of magnet 162 of secondary 160 to the right, thereby, advancing the secondary along primary 152 because the magnetic poles of the secondary 160 are "locked" onto the traveling EM wave. By this type of action, secondaries 160 and 170 are propelled to the right along the primary along with the traveling EM wave. Moreover, although a single secondary may be propelled by two zones at the same time, because the smallest zone can be 1$\lambda$ long while the secondary is 2$\lambda$ long, there is never a situation in which more than one secondary is in the same acceleration zone at the same time.

Figure 4:
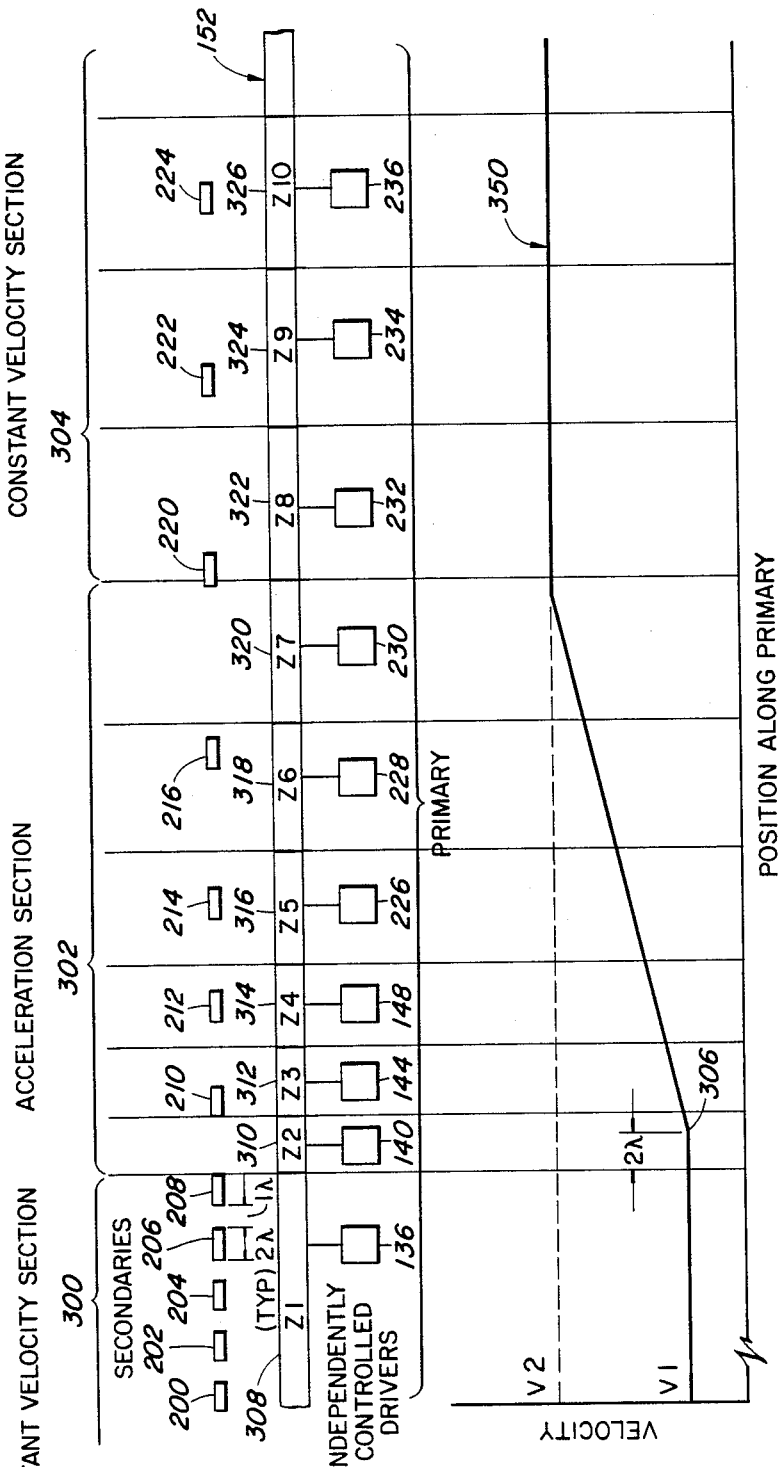
FIG. 4 shows a block diagram of the relationship between the independently powered zones of the primary and the secondaries as the secondaries are propelled through a first constant velocity section, an acceleration section and a second constant velocity section.

Referring to FIG. 4, a block diagram of a portion of the system of the invention displaying the relationship between the primary and secondaries as the secondaries are propelled along the primary from a first constant velocity section to an acceleration section to a second constant velocity section is shown. The secondaries are initially inserted into the system at fixed time intervals at or near the first constant velocity and in synchronism with the EM wave. In FIG. 4, representative secondaries 200, 202, 204, 206, 208, 210, 212, 214, 216, 220, 222 and 224 are shown being propelled along elongated primary 152. Primary 152 is divided into three sections, namely, first constant velocity section 300, acceleration (positive) section 302 and second constant velocity section 304. FIG. 4 represents an instant of time showing the relative position of each secondary with respect to the others presently in the system. First constant velocity section 300 is intended to propel the secondaries at a velocity less than that in second constant velocity section 304. However, it is understood that first constant velocity section 300 could propel the secondaries at a velocity greater than that in second constant velocity section 304 in which case, acceleration section 302 would be a negative acceleration section, and the size of the zones would decrease in length from left to right instead of increase.

Each section is further divided into one or more zones which are each connected to an individual zone drive means (FIG. 1) of which only the zone drivers are shown. First constant velocity section 300 comprises only one zone, Zone 1, 308, to which driver 136 is connected; acceleration section 302 comprises six zones in which driver 140 is connected to Zone 2, 310, driver 144 to Zone 3, 312, driver 148 to Zone 4, 314, driver 226 to Zone 5, 316, driver 228 to Zone 6, 318, and driver 230 to Zone 7, 320; and second constant velocity section 304 comprises three zones in which driver 232 is connected to Zone 8, 332, driver 234 to Zone 9, 324, and driver 236 to Zone 10, 326.

First constant velocity section 300, in which secondaries 200, 202, 204, 206 and 208 are closely spaced, is a single zone, Zone 1, 308. The secondaries proceed from first constant velocity section 300 to positive acceleration section 302.

In this section, the velocities of the secondaries, such as secondaries 210, 212, 214 and 216, are independently increased as they move to the right. The secondaries then proceed from acceleration section 302 to second constant velocity section 304 in which the velocity of the secondaries, such as secondaries 220, 222 and 224, is constant.

Graph 350 is a graph of the velocity of the secondaries vs. position along the primary. In graph 350 at 306, there is a 2λ segment at the beginning of the frequency slope up. This is necessary to insure that a secondary, which is 2λ long, enters the first acceleration zone completely before increasing velocity.

In FIG. 4, the system is operating at steady-state. The secondaries enter the system at first constant velocity section 300 at closely spaced intervals. The interval, as shown in FIG. 4, is a 3λ interval comprised of 2λ long secondaries with a 1λ spacing between magnetic edges of adjacent secondaries. However, the secondaries can enter the system unequally spaced by removal of certain secondaries as long as those that remain are in their same relative position with respect to the EM wave. That is, secondaries 202 and 204 can be removed for unequal spacing but secondary 200 must bear its same positional relationship with the developed EM wave.

Acceleration section 302 has zones of increasing length, which is most notable by comparing the length of Zone 2, 310, with the length of Zone 7, 320. The increased length of the zones in acceleration section 302, facilitates an economical method of accomplishing separation of secondaries by increasing their velocity in separate zones based on only one secondary being in a specific zone at any instant of time and each secondary transiting and leaving at least one zone, except for Zone 1, within a fixed time period. However, it is not necessary that the zones have increasing lengths. Each zone along the entire length of the primary can have the same length, for example, 1λ. If this is the case, it is merely necessary to add additional zone drivers and accompanying zone controllers to accommodate the increased number of zones.

Figure 5:
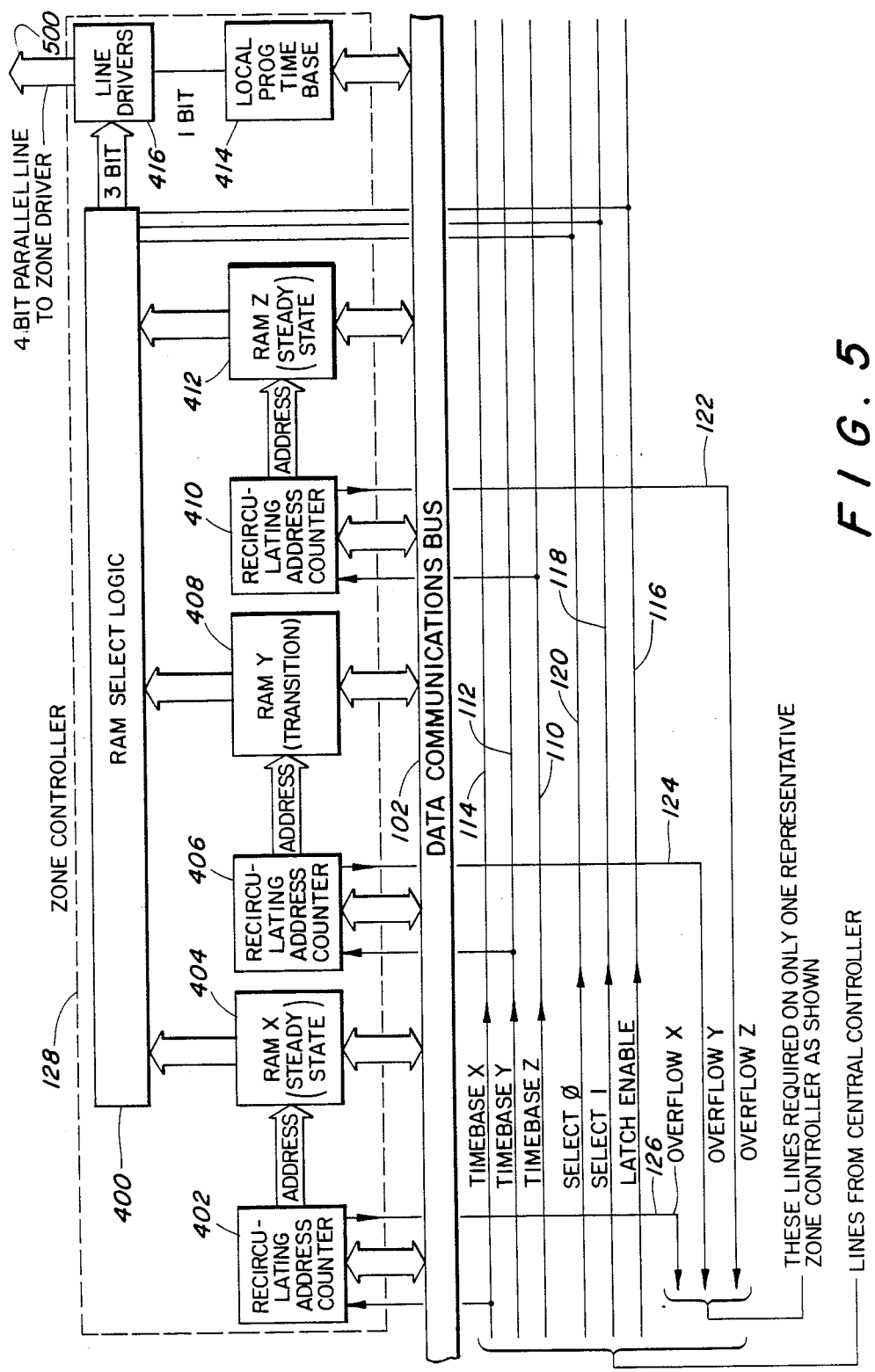
FIG. 5 shows a detailed block diagram of a zone controller shown in FIG. 1.

FIG. 5 is a detailed block diagram of a representative zone controller of a drive means. The zone controller shown in FIG. 5 is referred to by reference numeral 128 indicating the zone controller for Zone 1 in FIG. 1. Zone controller 128 has RAM select logic 400 and three recirculating address counter/random access memory (RAM) pairs, namely, steady-state RAM X pair comprising address counter 402 and RAM 404; transition state RAM Y pair comprising address counter 406 and RAM 408; and steady-state RAM Z pair comprising address counter 410 and RAM 412. Also included in zone controller 128 is line driver 416 and local programmable timebase 414. The recirculating address counter/RAM pairs are commercially available from Hewlett-Packard Company, Palo Alto, Calif., such as HP 69791A 64K Word Memory Module. The transition RAM Y pair is the same as the steady-state RAM X and Z pairs except it has additional memory connected thereto. This additional memory is commercially available from Hewlett-Packard Company, Palo Alto, Calif., such as HP 69792A, 192K Word Memory Module. As discussed previously, a zone controller need only contain one memory when the system is to be operated in one steady state only. In such an embodiment, the zone controller will contain only one recirculating address counter/RAM pair. Since this embodiment is to operate in only one steady state, RAM select logic 400 is also eliminated while the remainder of the zone controller remains substantially as shown in FIG. 5. The memory of each zone controller contains the binary instructions for the frequency and phase characteristics of a separate waveform.

In the preferred embodiment, each of the three RAMs have stored therein binary instructions for the frequency and phase characteristics of a separate waveform. As an example, RAM 408 will have instructions for the phase and frequency characteristics of a steady-state waveform; RAM 408 binary instructions for the phase and frequency characteristics of a transition state waveform; and RAM 412 binary instructions for the characteristics of a second steady-state waveform phase and frequency different from the one stored in RAM 404. The binary instructions stored in each RAM X, RAM Y and RAM Z type memory in all zone controllers have the same fixed quantity of addresses. The binary instructions for these waveforms and their use will be described in more detail subsequently but at this point it is to be understood that the binary instructions for transition state waveform stored in RAM 408 are used for transitioning from binary instructions for the steady-state waveform stored in RAM 404 to the binary instructions for the steady-state waveform stored in RAM 412.

The selected RAM has its contents output from RAM select logic 400 and input to line driver 416. The RAM selected by RAM select logic 400 will be in accordance with signals received from central controller 108 on lines 116, 118, and 120. Generally, the RAM type selected is selected in all zone controllers of the system. As an example, for a first steady-state operating condition, central controller 108 inputs signals to the RAM select logics of all zone controllers to select RAM X, 404. This is necessary because the power waveforms for adjacent zones are matched at the interface when RAMs of a particular type are selected.

In operation, timebase pulses, namely, timebase X signal 114, timebase Y signal 112 and timebase Z signal 110, from central controller 108 are input to the respective address counters of the recirculating address counter/RAM pairs when that RAM is selected. Taking for example the recirculating address counter/RAM pair, comprising address counter 402 and RAM 404, timebase X signal 114 paces address counter 402. Timebase X signal 114 will cause RAM 404 to provide an output based on this signal. Address counter 402 will sequence through the RAM addresses of RAM 404, and will restart the sequence once RAM 404 has reached the last preprogrammed address.

Central controller 108 controls which signals are output from all RAM select logics, controls the selection of the same RAM type, be it RAM X, RAM Y or RAM Z, for all zone controllers and starts them all in unison. Since, all RAMs X have the same number of instructions and all are paced by a common timebase signal, timebase X signal 114, they all sequence through their addresses, reach the end of their memory addresses and restart at the same time. Because this is the case, central controller 108 need only monitor overflow lines 122, 124, and 126 of one zone controller for overflow of the Z, Y and X address counters, respectively, to determine when the end of the memory of each RAM type is reached if it is desired to select a new RAM type. Selection of a new RAM can only occur after reaching the end of the memory addresses of the RAM currently being accessed. When changing from one RAM to another, there must not be an interruption in the output of instructions to the zone drivers. So, following the last output from the RAM currently being used, the next output will be the first output from the newly selected RAM based on the next timebase pulse.

RAM select logic 400 provides a 3 bit output to line driver 416. Line driver 416 receives a fourth bit from local programmable timebase 414. Local timebase 414 is programmed by system computer 100 and provides a 1 bit output signal for controlling voltage set point in the zone driver. The voltage set point value is a function of the average frequency level of the output of that particular zone driver.

FIG. 6 shows the logic truth table for RAM select logic 400. Latch enable signal 116, select-1 signal 118 and select-∅ signal 120 from central controller 108 determine which RAM is selected for output by RAM select logic 400. When latch enable signal 116 has a logic "1" value, but both select-1 signal 118 and select-∅ signal 120 have logic "0" values, the RAMs are disabled and the output of the RAM select logic 400 is a logic "0" value. When latch enable signal 116 has a logic "1" value and select-1 signal 118 is a logic "0" value but the select-∅ signal 120 has a logic "1" value, the steady-state RAM X, RAM 404, is selected by RAM select logic 400 for output to line driver 416. With latch enable signal 116 15 again having a logic "1" value, the select-1 signal 118 having a logic "1" value and select-∅ signal 120 having a logic "0" value, the transition state RAM Y, RAM 408, is selected by RAM select logic 400 for output to line driver 416. When latch enable signal 116 has a logic "1" value while both select-1 signal 118 and select-∅ signal 120 have logic "1" values, RAM select logic 400 selects steady-state RAM Z. RAM 412, for output from RAM select logic 400 to line driver 416. When latch enable signal 116 has a logic "0" value, RAM select logic 400 latches the value of its output prior to the logic "0" value. This output would be a 3 bit value from one of the RAMs.

FIG. 7 shows a logic truth table of outputs from central controller 108 with respect to the logic states of RAM select logic 400. When the RAMs are disabled, select-1 signal 118, select-∅ signal 120, timebase X signal 114, timebase Y signal 112 and timebase Z signal 110, all have logic "0" values from central controller 108. When RAM X is desired to be selected, select-1 signal 118 has a logic "0" value and select-∅ signal 120 has a logic "1" value, timebase X signal 114 is provided from central controller 108 to pace address counter 402, while timebase Y signal 112 and timebase Z signal 110 have logic "0" values. When RAM Y is desired to be selected, select-1 signal 118 has a logic "1" value and select-∅ signal 120 has a logic "0" value, timebase Y signal 112 is provided from central controller 108 to pace address counter 406, while timebase X signal 114 and timebase X signal 110 have logic "0" values. When RAM Z is desired to be selected, select-1 signal 118 and select-∅ signal 120 both have logic "1" values, timebase Z signal 110 is provided from central controller 108 to pace address counter 410, while timebase X signal 114 and timebase Y signal 112 have logic "0" values.

Figure 8:
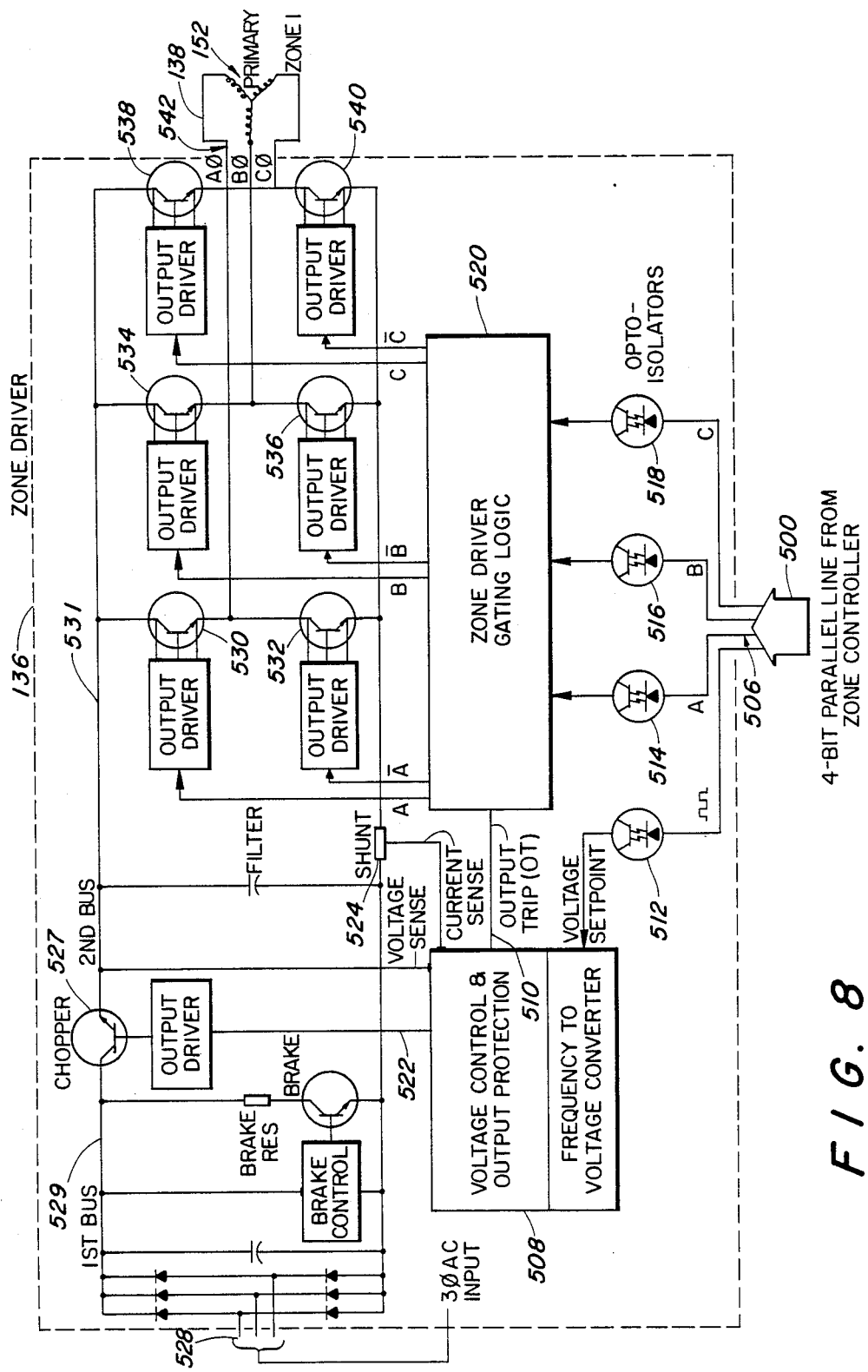
FIG. 8 shows a detailed schematic diagram of a LSM zone driver shown in FIG. 1.

In FIG. 8, a schematic diagram of zone driver 136 is shown. It is to be understood that FIG. 8 is merely representative of all zone drivers of the system of the invention. As previously noted, a zone driver, such as zone driver 136, is commercially available from Allen-Bradley Company, Milwaukee, Wis., such as Model No. 1340-FAA.

These drivers are modified by including gating logic circuit 520 and the frequency to voltage converter portion of circuit 508. Both of the modifications are conventional and would be understood by one skilled in the art without further explanation.

Zone driver 136 has six power transistors switches arranged in pairs, such as 530, 532; 534, 536; and 538, 540. Three-phase AC input 528 to zone driver 136 is rectified, chopped and filtered in a conventional manner to provide a DC voltage to the power side of zone driver 136. The voltage control portion of circuit 508 measures the voltage on second driver bus 531 and switches chopper 527 to bring the second driver bus voltage into agreement with the voltage set point called for by the voltage control system. The output protection portion of circuit 508 is for disabling zone driver 136 should a potentially damaging condition exist. The output protection portion of circuit 508 senses any current faults via shunt 524 and sends the appropriate signal to the gating logic circuit through output trip-off line 510 to open all power transistors as necessary for protection of driver 136.

Zone driver gating logic circuit 520 provides a digital input to the power transistors switches for controlling the output of the zone driver 136 for powering the φA, φB and φC coil windings 138 of primary 152. The 4 bit parallel input 500 from line driver 416 of zone controller 128 (shown in FIG. 5) is input to zone driver 136. Of the 4 bit parallel input, 1 bit is fed to the frequency to voltage converter portion of voltage control and output protection circuit 508 for setting the average voltage level for the driver, and the other 3 bits contain the binary instructions for switching the power transistors switches for controlling the frequency and phase of the power waveform for powering φA, φB and φC coil windings 138.

The A input associated with the φA coil winding of the primary is input to opto-isolator 514, the B input associated with the φB coil winding of the primary is input to opto-isolator 516 and the C input associated with the φC coil winding is input to opto-isolator 518. The three opto-isolators are commercially available, such as Model H11A1 available from Motorola, Inc., Austin, Tex.

Figures 9, 10:
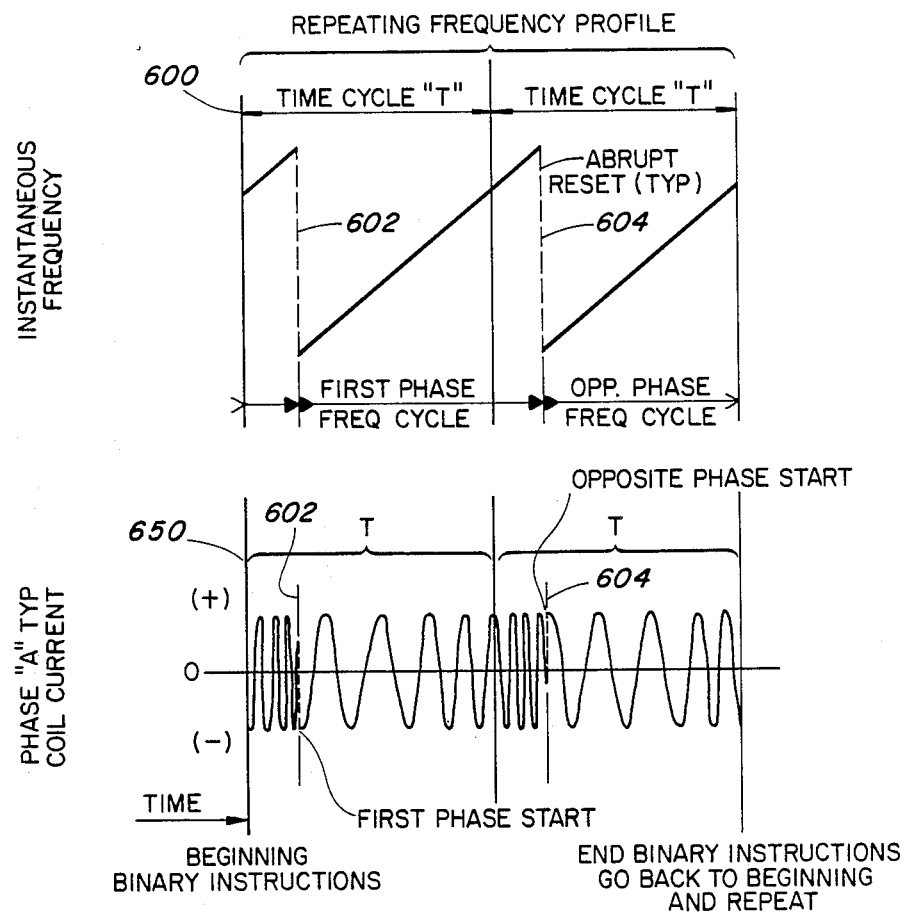
FIG. 9 shows a logic truth table for the inputs and outputs of the driver logic circuit of the LSM zone driver shown in FIG. 8.
FIG. 10 shows a representation of a repeating two cycle frequency profile and the corresponding waveform output from a zone driver after processing the binary instructions from the zone controller shown in FIG. 5.

FIG. 9 shows the truth table for the inputs and outputs of zone driver gating logic circuit 520 shown in FIG. 8. The 3 bits from line 500 cause switching of the power transistor switches to form a six step power waveform output for each phase coil consistent with the phase pattern shown in FIG. 3. However, other power waveforms, such as pulse width modulation can be used which is within the understanding of one skilled in the art.

In operation, the six logic lines output from gating logic circuit 520 are input to the power transistor switch pairs, namely, 530, 532; 534, 536; and 538, 540, to cause them to switch in a predetermined manner to develop a six step three phase power waveform. Therefore, the binary instructions input to zone driver 136 from zone controller 128 cause development of the power waveforms for powering of the $\phi A$, $\phi B$ and $\phi C$ coil windings to in turn develop the desired traveling EM wave in the primary with the proper frequency and phase.

Referring to FIG. 10, a representative sloping frequency profile developed in an acceleration zone of the primary from binary instructions stored in a steady-state RAM, such as RAM 404, is shown. The profile shown at 600 is indicative of the instantaneous frequency of the power waveform developed in the primary of a specific zone. The waveform shown at 650 is indicative of the frequency and phase of the varying alternating current (or power waveform) that occurs in the primary coils consistent with the sloping frequency profile shown at 600. Each frequency profile contains two cycles, one for each cycle time, "T". The time, "T", represents the time required for successive, adjacent secondaries to move past a fixed reference point along the primary. Each RAM selected will output two complete cycles before repeating.

In representations shown at 600 and 650, during cycle time, "T", at 602 and 604, respectively, the frequency resets. This reset, besides being the start of a new frequency slope, also undergoes a 180° phase shift. This 180° phase shift is necessary because adjacent secondaries have their magnetic poles oppositely disposed.

Figure 11:
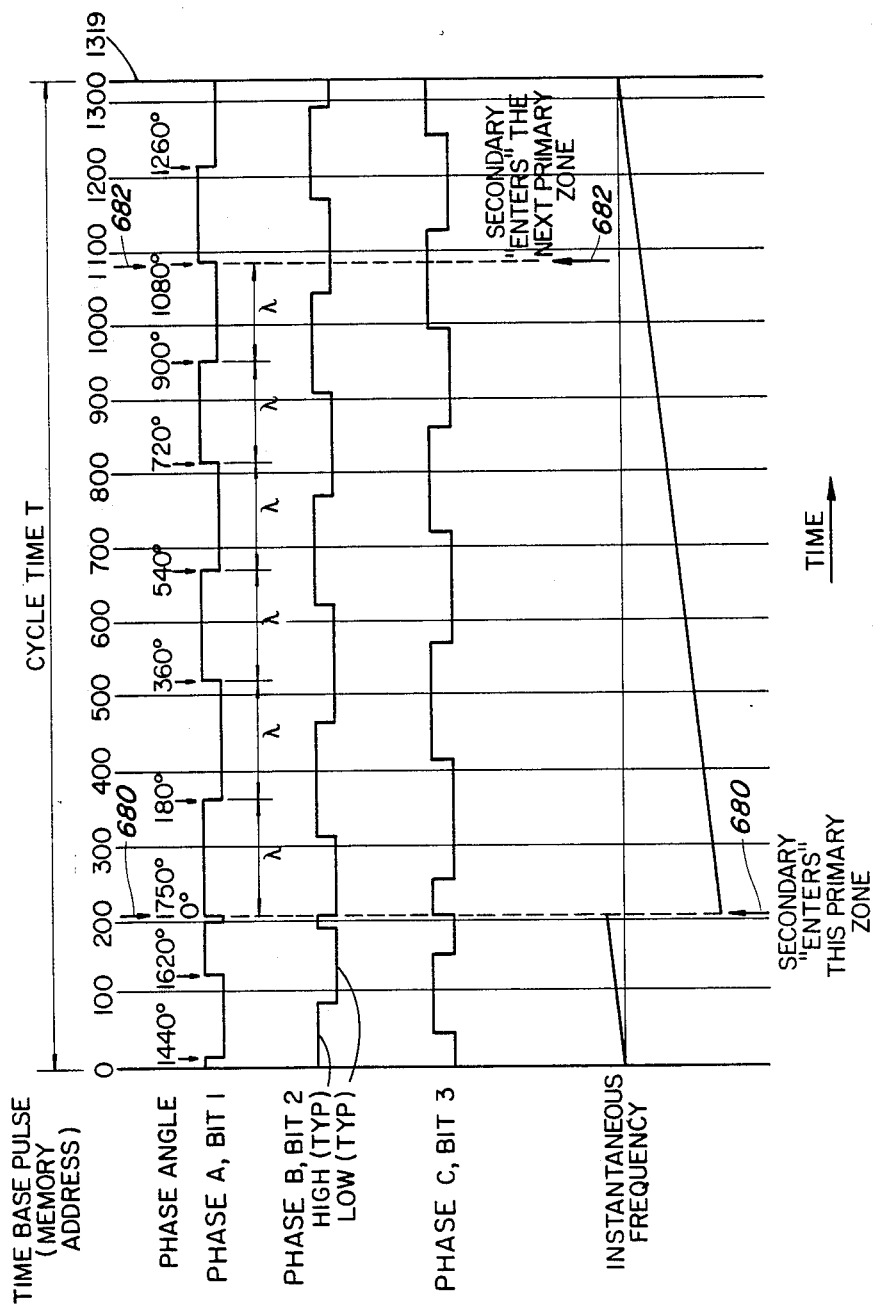
FIG. 11 shows a graphical representation of the binary instruction outputs from a zone controller to a zone driver for one cycle versus phase angle, representative memory address, and frequency slope up of the power waveform developed in the primary.

FIG. 11 shows a graphical representation of the binary instructions for the $\phi A$, $\phi B$ and $\phi C$ outputs from a zone driver vs. the memory address accessed, and phase angle. Also shown in FIG. 11, is the corresponding frequency profile slope up for one time cycle as shown in FIG. 10.

As previously noted, $\frac{1}{2}$ AC cycle causes the EM wave to travel one pole pitch or $1\lambda$. Therefore, the position of a secondary being propelled by such EM wave relative to a primary zone can be traced along the binary instruction waveforms as indicated by the designations below the $\phi A$ plot. Each of the primary zones are $1\lambda$ or a multiple of $1\lambda$ in length. This will mean that any secondary will always be "handed-off" from one zone to the next at a multiple $\lambda$. However, the zones do not have to be of equal $\lambda$ lengths.

As a secondary begins to enter a zone, at 680, the phase angle is 0°. Also at 680, the frequency slope resets based on the binary instruction at a memory address beyond address 200. The "hand-off" and reset occur simultaneously at this same memory address. From the point of simultaneous "hand-off" and reset, the phase angle and frequency increase with time as shown by the positive slope of the instantaneous frequency curve. This can also be seen by the decreased width of the respective $\phi A$, $\phi B$ and $\phi C$ pulses as they move toward the right. The frequency slope up is continuous until the secondary begins to enter the next zone of primary at 682 at phase angle 1080° and a memory address just prior to address 1100, when the next "hand-off" takes place. The frequency for the zone that the secondary is leaving continues to slope up until the "hand-off" is complete. It is only then that the frequency pattern resets. Also, at reset, the frequency pattern will phase shift 180° to accommodate the next secondary which has its magnets disposed oppositely.

FIG. 12 primarily shows a graphical representation of the composite frequency slopes of the acceleration section of the system of the invention. The frequency profiles which make up the composite frequency slopes are repeating sawtooth profiles for each zone which match and overlap the profiles of the zones adjacent to it. This matching and overlap allows for the smooth "hand-off" of secondaries from one zone to another, as will be described subsequently.

Preferably, in order to properly propel the secondaries, the system of the invention is configured such that any one secondary will pass through one specific acceleration or second constant velocity zone, no matter the length, in a time less than the fixed cycle time, which in FIG. 12 is referred to as cycle time, "T". Cycle time, "T", is a function of the initial minimum secondary spacing and the actual velocity of the secondaries as they enter the system. However, only one secondary will enter a specific zone during each cycle time, "T". Once the system is operating and the first secondary has reached the end of the primary, the system will contain the maximum number of secondaries, so from this point on, for every secondary that enters the system one must leave the system, thereby, keeping the number of secondaries in the system constant.

In FIG. 12, acceleration of secondaries from a first constant velocity, indicated at F1, 700, to a second constant velocity having a higher velocity value, indicated at F2, 726, is shown. The Zone 1 frequency profile is a constant frequency profile operated at frequency F1, and the Zone 8 frequency profile is a constant frequency profile operated at frequency F2. The intermediate zones, Zones 2 to 7, with sloping up frequency profiles are acceleration zones through which the secondaries are accelerated from frequency F1 to frequency F2.

Also as indicated in FIG. 12, the cycle time, T, is the time interval in which adjacent closely spaced secondaries enter the LSM system of the invention.

Secondaries A, B, C and D are individual secondaries that enter the first acceleration zone of the plurality of acceleration zones from the first constant velocity zone every time interval, "T". At time, $t_o$, secondary A is traveling along the primary in Zone 1 at a constant velocity determined by frequency F1. As secondary A moves further to the right in Zone 1, at a time indicated at 714, it is "handed-off" to Zone 2 which has had its frequency and phase reset to match that of Zone 1 at 714. Until the "hand-off" is complete, the frequency in Zone 2 continues to operate at the same frequency and phase of the Zone 1. After the "hand-off" is complete, at 702, the frequency in Zone 2 begins to slope up in accordance with the preprogrammed binary instruction stored in the Zone 2 zone controller, which in the normal case is RAM X, 404. As the frequency slopes up, secondary A is accelerated positively along the primary. Secondary A will continue to accelerate in accordance with the frequency slope of the Zone 2 frequency profile until it reaches point 716 at which point it is "handed-off" to Zone 3. At the point of "hand-off", 716, the Zone 3 waveform and the Zone 2 waveform are momentarily matched in varying frequency and phase as the secondary completely crosses the interface between zones, and a smooth "hand-off" of the secondary is carried out. During "hand-off" between the acceleration zones, the system of the invention matches the continuously varying frequency and phase but does not interrupt the secondary's acceleration with a constant velocity plateau as is found in prior art systems. Following completion of the "hand-off" the Zone 2 frequency profile will reset.

After the "hand-off" takes place at 716, subsequent "hand offs" at 718, 720, 722, 723 and 724 between the remainder of the adjacent acceleration zones, between the last acceleration zone and first zone of the second constant higher velocity section and between successive zones of the second constant higher velocity section are carried out in the same manner described above.

As is shown in FIG. 12, subsequent secondaries B, C and D enter the system at multiples of time, "T", namely at time $t_o+T$, time $t_o+2T$, and time $t_o+3T$, respectively, and are accelerated in the same manner as secondary A. Further, as shown, none of the secondaries are in the same acceleration or second constant higher velocity zone at the same time; therefore, independent acceleration and spacing of the individual secondaries is carried out.

Figure 13A:
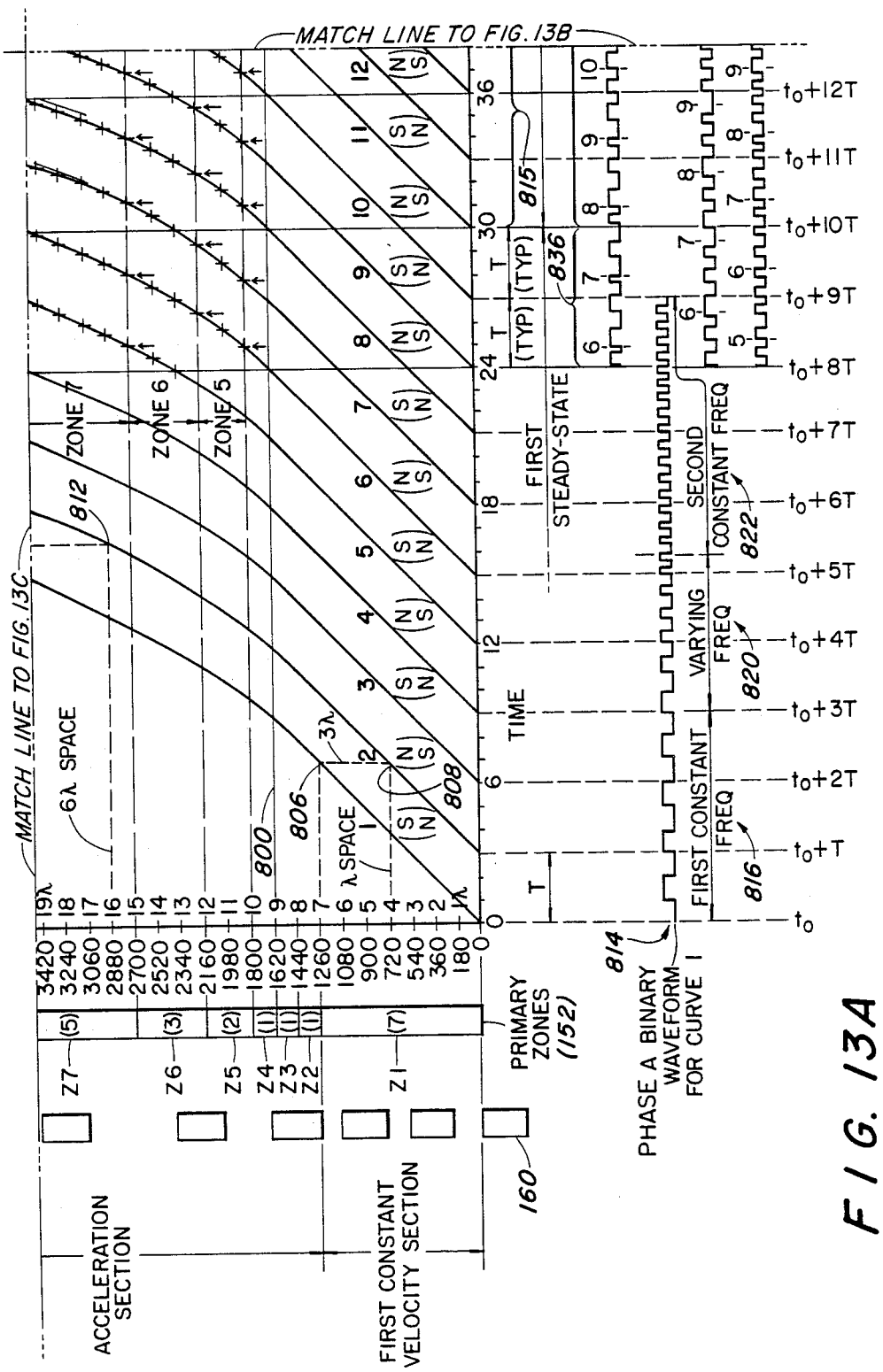
Figure 13C:
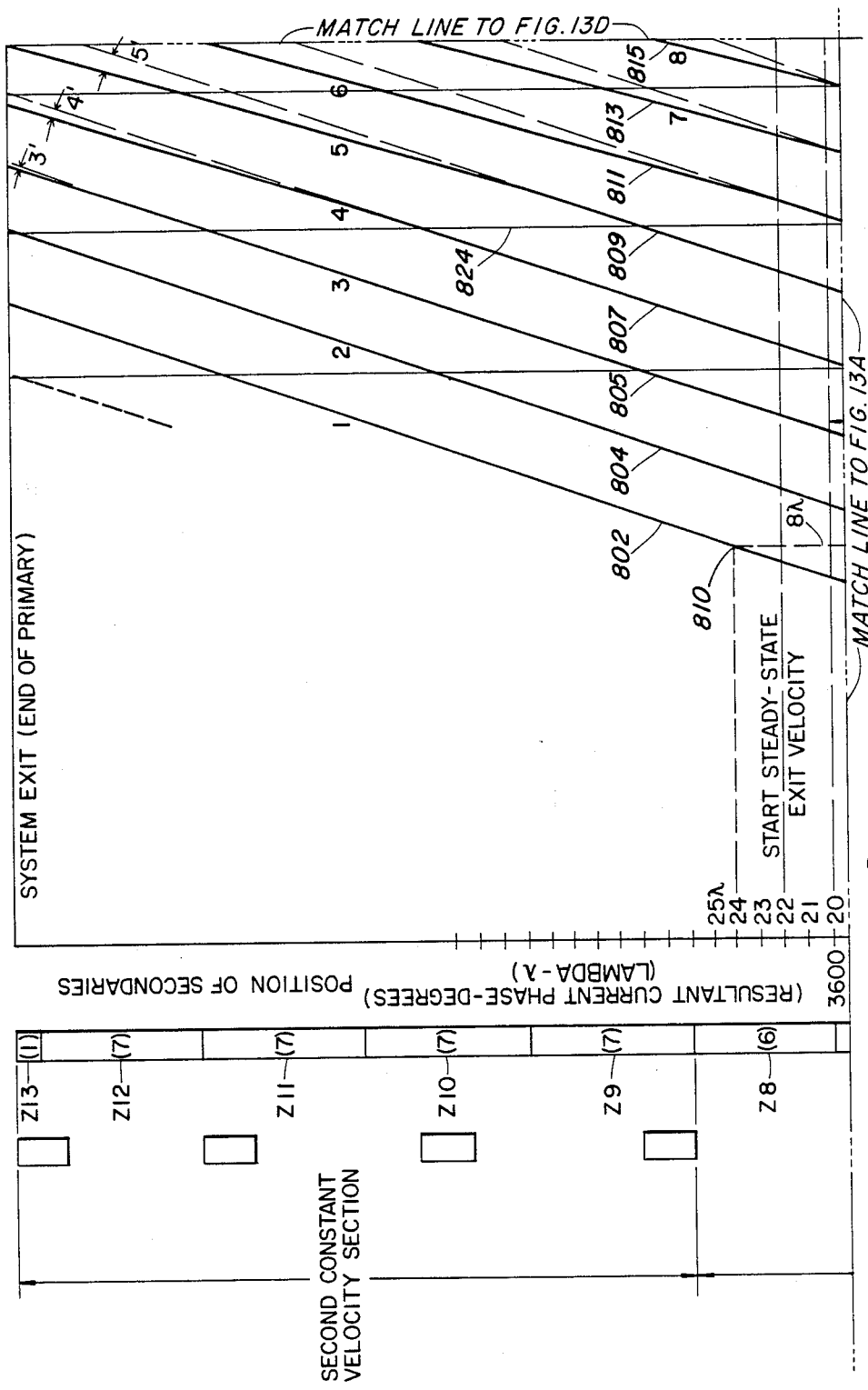

Referring to FIG. 13, a graphical representation of position vs. time for twenty secondaries traveling through the system of the invention is shown. With respect to FIG. 13, steady-state operations, and transition state operations will be described. This graphical representation shown in FIG. 13 is derived by a method described subsequently.

Adjacent to the abscissa of the graph shown in FIG. 13 are representative zones, Zones 1 to 13 with their length in "λ" indicated in parenthesis. The specific zones are labelled with abbreviations such as Z3, representing Zone 3. The abscissa of the graph has marked along it phase angle in degrees with their corresponding λ equivalents. The position along the primary of any secondary which enters the system can be determined by knowing its phase angle. This is true, since the pole pitch of the EM wave is fixed at λ which matches the coil pole pitch of the primary, e.g., A phase to A phase. The EM wave, and any secondary "locked" onto it, will travel the distance of 2λ along the primary for every 360, phase change of the resultant AC current powering the coil windings of the primary that produces the EM wave. The distance a secondary has traveled along the primary can be determined by the following expression:

*Secondary position* $= 2\lambda(phase)$ where, phase is measured in AC cycles or degrees divided by 360°. Therefore, position of the secondary along the primary can be as shown along the abscissa as either phase angle or (N)λ, where N is a positive number.

The value of the binary instructions used for developing the power waveform of that frequency and phase can be determined by translating the phase angle to the curve for that specific secondary and then translating position on the curve to the particular time along the waveform, such as the binary output waveform for φA binary instructions 814 disposed below the ordinate of the graph. These high or low values are derived from the truth table shown in FIG. 9.

Waveform 814 is the predetermined A-phase binary instructions for the φA power waveform for developing the EM wave for propelling a secondary through the system along curve 802. It is understood that by shifting 60° (or $\frac{1}{6}\lambda$) or 120° (or $\frac{2}{6}\lambda$) from each whole λ unit of the primary, the C phase and B phase binary instruction waveforms can be determined, respectively. In essence, the C and B binary waveforms are similar to A-phase waveform 814 except shifted 60° or 120° to the right, respectively. Also as can be seen, the binary instructions waveform of the A-phase at 814 is constant in first constant frequency section 816, increasing in varying frequency section 820 and constant again, but at a higher frequency in second constant frequency section 822.

The particular steady state waveforms such as that for φA shown at 814 of FIG. 13, are derived based on the predetermined position of the secondaries along the primary at a given instant of time. Therefore, in order to load the proper instructions in the RAMs of the driver controllers, the following method is used to derive such instructions.

Initially, the spacing for the moving secondaries entering the system is determined. This also determines the repeating time interval, "T", between successive secondaries which move past a fixed reference point in the system. A position vs. time profile is determined for all of the secondaries of the system, when all of the secondaries follow the same position vs. time profile displaced in increments of time "T". After this, corresponding to the position vs. time profile, a phase angle vs. time determination is made for each secondary in the system at spaced time intervals of "T". Subsequent to this determination, a phase angle vs. time determination for each zone is made by: (1) selecting a starting phase angle corresponding to a selected position of a secondary before such secondary enters a specific zone, which in the present invention is the position where the leading edge of the secondary is at the zone boundary, i.e., the beginning of "hand-off"; (2) determining from the phase angle versus time information an interval of information of length "T" beginning with the starting phase angle for the specific zone; and (3) ensuring that the beginning phase angle versus time information for the specific zone matches that of the previous zone at least over the phase angles corresponding to the length of a secondary, meaning that length necessary for a secondary to completely cross the physical zone boundary, but if this is not the case, the position versus time profile or the zone length must be adjusted followed by a repeat of the above steps. In the process above, it is the third step that ensures that there is only one secondary in a zone of the acceleration section at any given instant of time.

Once the phase angles vs. time determination is made for each zone, the zone driver switching signals for each zone are determined. This determination is made by: (1) encoding the phase angle versus time information for each zone into binary switching instructions at discrete points within the time "T" interval of information, where (a) the points must be equally spaced and exactly divide the time interval "T", and (b) the number of points must be the same for all zones, with this number also being equal to the number of memory locations for a given memory type for all of the respective zone controllers; and (2) arranging the switching instructions for each zone into a common time interval designated "$T_c$" by, (a) dividing the total time required for a secondary to reach the selected starting phase, which in the present invention is the beginning of "hand-off", by the interval "T" to determine the fractional time beyond the last whole time interval "T", and (b) beginning the common time interval "$T_c$" at the above fraction of time interval "T" and mapping the switching instructions beginning with the starting phase instructions and continuing to the end of the common time interval "$T_c$", and (c) continuing at the beginning of common time interval "$T_c$" mapping the remainder of the instructions, whereby, the remaining instructions when mapped will end at the starting phase instructions.

In operating the system subsequent to carrying out the above actions, zone driver switching instructions from the zone controller memories of a single memory type, RAM X, Y or Z, are simultaneously and continuously paced beginning at a common start time, which in the present invention is preferably at the beginning of common time interval "$T_c$". This will cause each zone to start and repeat its switching instructions for each time interval "T" for each secondary. Now by feeding secondaries into the system at the beginning of each time interval "T", travelling at initial system speed, the secondaries will be in synchronism with the EM wave and be properly "handed-off" from zone to zone throughout the system.

Again referring to FIG. 13, based on the position of a given secondary along the primary, the spacing of that secondary with respect to adjacent secondaries is always known. Taking for example, the first secondary traveling along curve 802, if that secondary has its leading edge at point 806, it is at phase angle 1260°. Tracing down from curve 802 to curve 804 for the second secondary, the line crosses at 808 putting the leading edge of the second secondary at phase angle 720°. This indicates that there is a 3λ spacing between the leading edges. Since each secondary is 2λ long, the spacing between the magnetic edges of these secondaries is 1λ at this point. In like fashion, a first secondary along the curve 802 with its leading edge at 810 is spaced 6λ ahead of the second secondary which will have its leading edge at point 812 along curve 804. This increased spacing means that the successive secondaries are being individually accelerated in the appropriate acceleration zones, independent of the other secondaries.

The method of changing a first steady-state to a transition state and then to a second steady-state will be described referring to FIG. 13. When secondaries 1 through 10 enter the system, all are propelled by the first steady-state, such as that from RAM X of the zone controllers. This will remain true until time, $t_o+10T$, as will be explained.

The first and second secondaries traveling through the system along curves 802 and 804, respectively, are subjected to only the first steady-state condition of the RAM X. Secondaries 3-11 which travel through the system along curves 805, 807, 809, 811, 813, 815, 817, 819 and 821, respectively, are affected to some degree by the transition state, stored in RAM Y of the zone controllers, when at time $t_o+10T$ the transition state is selected to change steady-states of operation. Secondaries 12-20 traveling through the system along curves 823, 825, 827, 829, 831, 833, 835, 837, and 839, respectively, will follow the second steady-state curves, such as that stored in RAM Z of the zone controllers but until secondary 11 leaves the system, the second steady-state condition, as per RAM Z, cannot be instituted, as will be described.

When it is desired to transition from the first steady-state to the second steady-state, the transition state, such as that stored in RAM Y, is selected for all zone controllers. As is shown in the graph, the transition state is selected at time, $t_o+10T$. The transition state operates from time, $t_o+10T$ to $t_o+18T$, indicated at 824 and 834, respectively. At time $t_o+18T$, the last secondary, secondary 11 which is affected by the transition state leaves the system.

When the transition state is selected, it will affect the secondaries along the portion of the primary undergoing change and the secondaries that enter such portion undergoing change during the predetermined time the changes are taking place. So, at time $t_o+10T$, tracing line 824 upwards from the end of the first constant velocity section plus 2λ at 800, it is readily seen that the secondaries in the system at time $t_o+10T$ are secondaries 3 to 8. These secondaries are affected by the institution of the transition state at time $t_o+10T$. During the time the change takes place, the bracketed period at 815, secondaries 9 to 11 are affected.

During the transition state, the waveform powering the primary is non-repeating as it is for steady-state operation. The non-repeating waveforms shown by section 838 of the representative waveforms 850, 860 and 870 for acceleration Zones 5, 6 and 7, respectively, are representations of these waveforms. It is not until the second steady-state, shown at 840 that all zone waveforms, such as waveforms 850, 860 and 870 for Zones 5, 6 and 7, respectively, begin repeating their waveforms indicative of steady-state operations.

Portion 815 of the transition state between lines 824 and 832 and above line 800 is the portion within which the slopes of the curves are changing. In portion 815, the separation of the secondaries that leave the system have time spacings between adjacent secondaries decreasing to a minimum value from the normal time, "T", spacing, with the minimum occurring between secondaries 5 and 6 along curves 809 and 811, respectively. This is indicative of the changing nature of the curves and differences in velocity of the secondaries. After line 832 until line 834, the new steady-state velocities are established but no single curve has the new slope throughout its entire length, which is indicative of the residual affects of the transition state on these curves. This also means that the time at which successive secondaries leave the system has not been stabilized and returned to time, "T" spacing. Until this stabilization is attained, the new steady-state condition is not fully reached at which time the second steady-state waveform of RAM Z can be initiated to power the primary and propel the secondaries. The time separation between secondaries leaving the system steadily increases from the minimum between secondaries 5 and 6 along curves 809 and 811, respectively, to a time spacing of "T" between secondaries 12 and 13 along curves 823 and 825, respectively, which is directly after line 834 when the second steady-state is initiated. Therefore, before the second steady-state can be initiated the system must be flushed of all of the secondaries affected by the transition state.

In operation, RAM select logic for all the zone controllers would operate with the steady-state instructions stored in RAM X until time $t_o+10T$, at 824. At that time, the RAM select logic will select the transition state by selecting RAM Y. The transition state will be operative from time $t_o+10T$ at 824 to time $t_o+18T$ at 834. That is, the transition state has a preprogrammed time of operation of 8T. This preprogrammed time is the time that it takes for all of the secondaries affected by the transition state to be flushed from the system. At time $t_o+18T$ the controller will automatically direct the RAM select logic to select RAM Z for operating the system at the new steady-state. Once operating in the second steady-state for RAM Z, the system computer can reprogram RAMs X and Y with new binary instructions. This new programming would provide RAM X with a new steady-state which could be for a higher or lower velocity of the secondaries. The new programming for the RAM Y will be for transitioning from the RAM Z steady-state to the new RAM X steady-state.

The transition instructions for carrying out transitioning from the first steady state to the second state are derived based on a predetermined position versus time of each secondary propelled along the primary by the specific zones during the total transition time. The following is the method for determining the instructions to be loaded into the transition state RAMs of the plurality of zone controllers for carrying out transitioning from the first to the second steady state.

As was true for steady state operations, secondaries enter the system at the predetermined spacing of time interval "T". Initially, a position versus time profile is determined for all of the secondaries in the system at initiation of the transition state. However, the secondaries in, or entering, the system during the transition state do not follow the same position versus time profile. So, to begin with, there is a determination of the position versus time relationship desired for each secondary affected during the transition state with deference to the requirement that only one secondary is in a zone at any given instant of time. For each position versus time profile for the respective secondaries, a phase angle versus time determination is made. Subsequent to this, a phase angle versus time determination for each zone is made by: (1) determining at the initiation time of the transition state the profile of the secondary that is in a specific zone, or if a specific zone is empty, the profile of the last secondary in that zone, and develop the phase angle versus time information from the profile; (2) determining from the phase angle versus time information of the above identified profile, an interval of information beginning at the transition state initiation time, which will be at a whole multiple of time interval "T", and continuing the interval to the starting phase angle of the first secondary entering the zone after initiation of the transition state in the same manner as described above for steady state; (3) determining from the phase angle versus time information of this first secondary's profile, an interval of information beginning at the starting phase angle of this secondary to the time that a second secondary enters the zone; (4) determining from the second secondary's profile the required information as was obtained in step 3 above; (5) continuing the determination process of step 3 above for each successive secondary until each reaches the end of the transition time interval designated "$T_r$", which will occur at a multiple of time interval "T"; (6) ensuring that the beginning phase angle versus time information for each secondary entering a zone during the transition state matches the information for the same secondary in the previous zone at least over the phase angles corresponding to the length of a secondary, meaning that length necessary for a secondary to completely cross the physical zone boundary, but if this is not the case, the position versus time profile or the zone length must be adjusted by repeat of the above steps; (7) encoding the phase angle versus time information for each zone into binary switching instructions at discrete points within the interval "$T_r$" of transition information where, (a) the points must be equally spaced and exactly divide each interval "T" within interval "$T_r$", and (b) the number of points must be the same for all zones, with this number also being equal to the number of memory locations for the transition memory for all zone controllers; and (8) mapping switching instructions for each zone into the common transition time interval "$T_r$" one to one.

To operate the system in the transition state, the system is initially operating in a first steady state and the transition state is selected for all zone controllers at the end of execution of the last instruction in the first steady state RAM. On the next clock pulse, the transition instructions are output simultaneously from all zone controllers starting at the beginning of the common transition time interval "$T_r$". This causes all of the zone controllers to output transition instructions simultaneously until their respective transition state RAMs reach the end of the transition period in unison. When this end is reached, the second steady state is selected and initiated. The transition instructions are non-repeating and are output only once with the last instruction ending at a predetermined multiple of time interval "T".

For those secondaries affected by the transition state, the original curve for their travel through the system is indicated by the "prime" notation, such as for curve 8, its original curve is marked 8'.

The present invention discloses a system for propelling secondaries along an elongated primary. It is also contemplated that the present invention can have a return side returning the secondaries from the end to the beginning of the elongated primary. In the resulting system, the secondaries are returned to the beginning of the elongated primary by oppositely accelerating the secondaries along the return side. This return side can be a mirror image of the elongated primary for purposes of accelerating the secondaries, or it can be other appropriate means which will supply the secondaries back to the entrance zone of the elongated primary.

In a preferred embodiment, when a return side is provided to form an endless loop for the secondaries, the system of the described invention is particularly suited for use in drawing, or stretching, a web of sheet material or film in a center frame. In brief, it is known to draw film, in either the longitudinal, or machine, direction or in both the machine direction and a direction lateral to or transverse to the machine direction (e.g., biaxially), by gripping the edges of the film with center clips which are attached to carriages which travel in endless tracks on either side of the film. The film is drawn in the machine direction (MD) by propelling the clips in pairs along the tracks at ever increasing velocities using linear motors to space the pairs of clips from each other and thereby draw the film longitudinally. Transverse direction (TD) drawing occurs as the clips follow diverging portions of the track. A typical method for drawing film in this manner is shown in the previously mentioned U.S. Pat. No. 3,890,421 and Japanese patent publication No. 48-38779.

These prior publications, however, do not teach the process nor the carefully coordinated controls required in drawing film in accordance with the instant invention. In the invention, pairs of clips which are directly opposite each other, are propelled, while maintaining this opposite positioning, at identical velocities and precise spacings with adjacent, opposed, center clip pairs. This is made possible by use of the synchronous linear motor system of this invention.

In the center frame apparatus and process of the invention, two endless tracks guide individual carriages in loops that are arranged opposite one another with the film passing between the loops. The synchronous secondaries are attached to the individual carriages to which are also attached center clips to grip the edge of the film. Elongated primaries are located opposed to each other on the film drawing or operational side of each loop and are adjacent the secondaries on the carriages to engage them electromagnetically. Each primary includes a plurality of groups of coils with the groups of coils in one primary sized to match the opposed groups of coils in the other primary and with each of the opposed groups of coils being electrically joined and defining a single control zone. The linear synchronous motor system previously described is applied to control the power to these control zones and thereby propel opposed pairs of carriages in symmetry through each control zone and from one control zone to the next throughout the center frame. The tracks in each loop can diverge as in a conventional center frame and simultaneously the carriages gripping the edges of the film can be separated in the MD and TD as the carriages travel along the track. The film can thereby be simultaneously biaxially drawn or stretched.

The tenter system of the invention also has means to alter the MD draw ratio while continuing to simultaneously biaxially draw the film which permits threading-up film at low MD draw ratios and then gradually changing the MD simultaneous biaxial draw ratio to a higher level for continuous operation. This feature also permits rapid, low cost optimization of film drawing ratios without having to shut down the line and fabricate and install new parts for new incrementally changed draw ratios. In commercial simultaneous biaxial film tenters, the simultaneous MD draw cannot be controlled after start-up, so the simultaneous MD draw ratio at start-up and the simultaneous MD draw ratio for continuous operation have to be the same. For certain film polymers, however, there is the problem that film tearing occurs when threading-up at high draw ratios. Furthermore, the system of the invention offers precise predictable control of carriage motion with few moving parts and an open-loop control system and without mechanical screws or position and drive signal feedback systems. The instant tenter frame can operate at much higher draw ratios and line speeds than previously possible.

Figure 14:
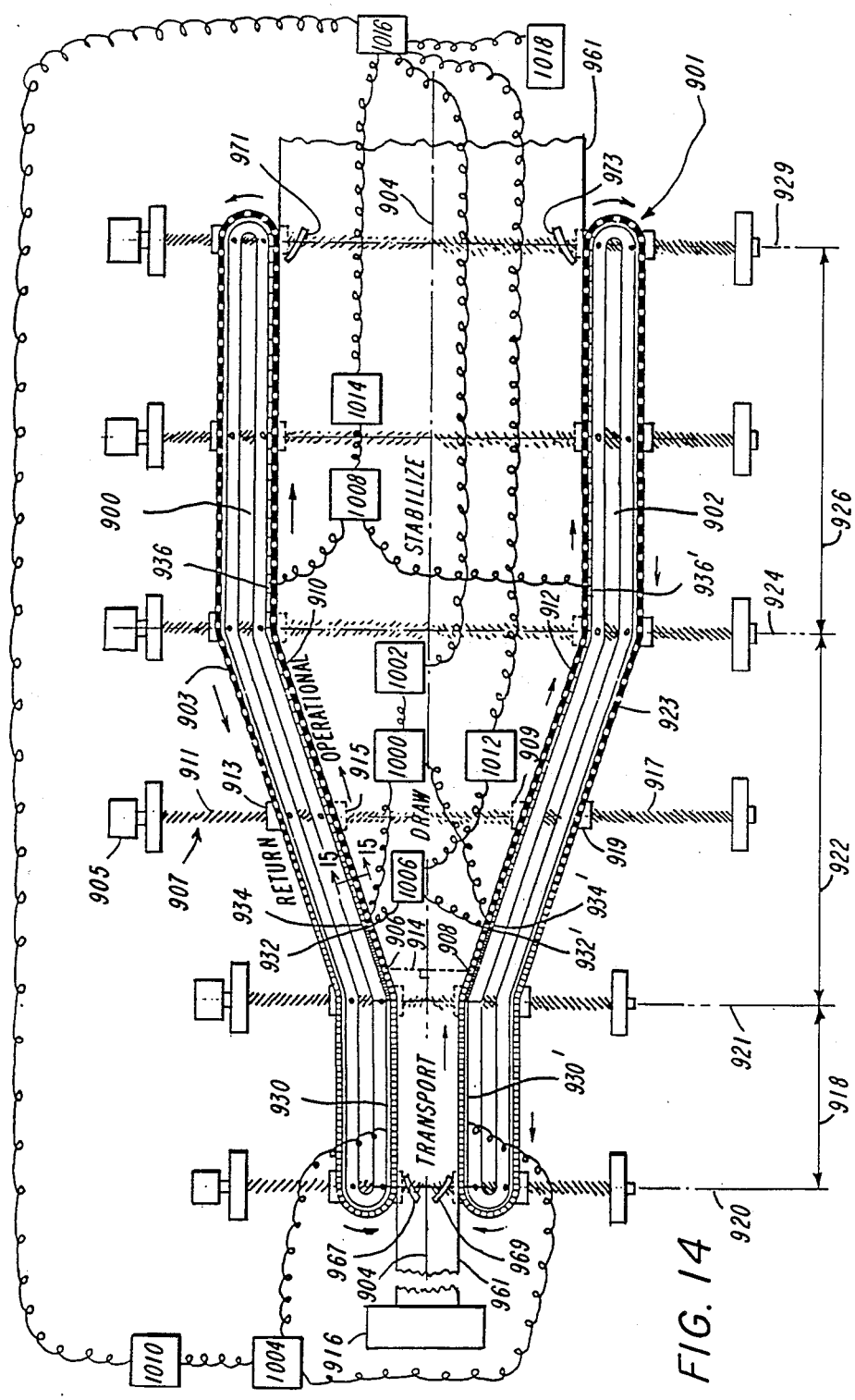
FIG. 14 is a schematic top plan view of a simultaneous biaxial drawing center frame of the invention.
Figure 15:
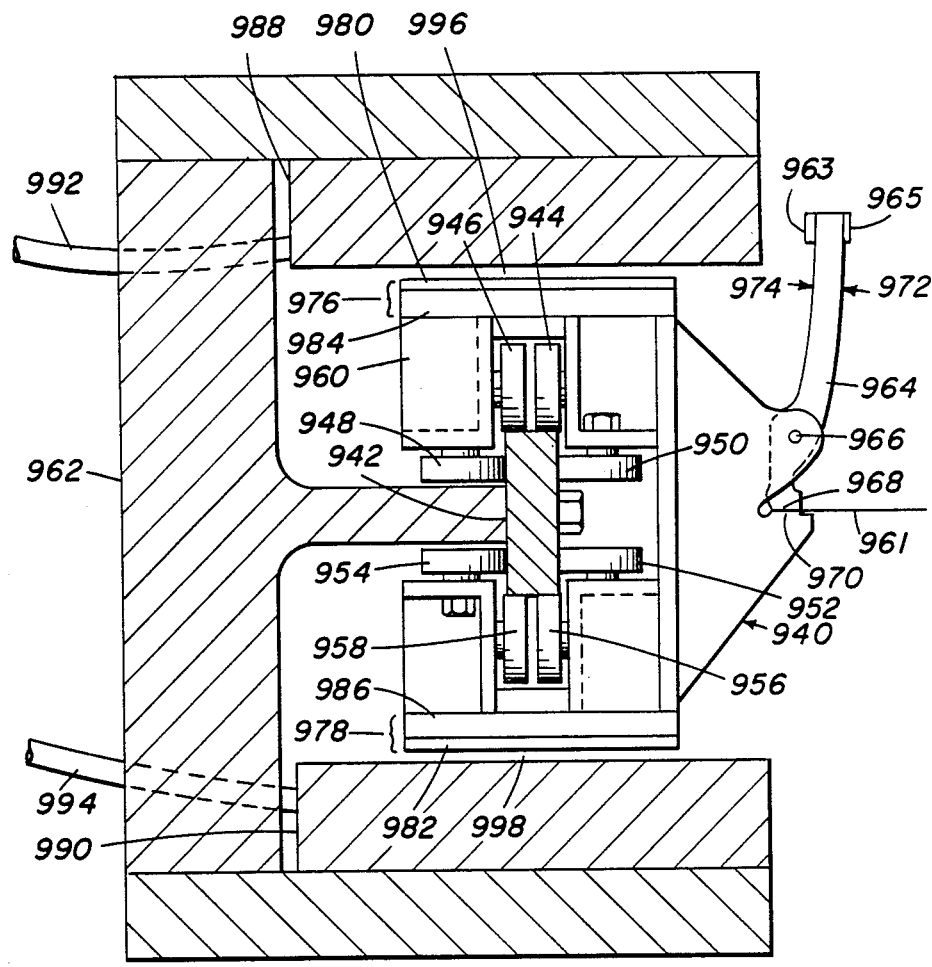
FIG. 15 is a typical cross-section of the operational side of a loop taken at 15—15 in FIG. 14.

In greater particularity, and referring specifically to FIGS. 14 and 15, an apparatus or tenter frame 901 is shown which is suitable for drawing a web of sheet material 961, such as plastic film, to improve its properties.

In the operation of this apparatus a web of film to be drawn is supplied from a supply source 916, such as a supply roll or from a film casting operation and moved by appropriate means into the tenter frame 899 which comprises a pair of elongated endless track loops 900 and 902 positioned opposite each other. The two loops 900, 902 are symmetrical, with elements of loop 900 mirrored in loop 902. The tenter clip carriages are shown as white blocks in a black field, such as carriages 906, 908, in the two loops. The carriages are propelled along the operational sides 910 and 912 of loops 900 and 902 respectively in paired symmetry. That is, the carriages such as 906 and 908 are aligned along a line 914 drawn perpendicular to center line 904 centered between the operational sides of the two loops.

Each track loop has a number of portions or sections which define the operational sides 910 and 912 and the return sides 903 and 923 of the tenter frame. Specifically the first portion of the tracks define a transport section 918 where the film is conditioned prior to drawing by heating it to the desired temperature without permitting stretching to occur.

The second portions of the tracks define the key drawing section 922 of the tenter frame. These portions of this section typically diverge outwardly from a machine centerline for drawing the web in the transverse direction.

Third portions of the tracks are connected to the second portions on the forward or operational section of the tenter frame. These portions are opposite each other, equidistant from the centerline of the frame, and define between them a stabilizing section 926 of the apparatus.

These first, second and third portions of the tracks define together the operational sides 910 and 912 of the tenter frame. The tracks are completed on return sides of the frame 903 and 923 by fourth portions where the tenter clips are disengaged from the film. The fourth portions connect the first portions to the third portions of the tracks to complete the endless paths.

A plurality of carriages such as 906, 908, and 940 are positioned for movement on the elongated track loops 900 and 902. The carriages have tenter clips attached to them, as best seen in FIG. 15, which are adapted to grip the edges of the film as it enters the tenter frame 901 and to release the film after it has been moved by the carriages through the operational sides. After releasing the film the carriages are propelled around the return sides of the tenter frame into position to repeat the drawing operation.

The linear synchronous motor control system of the invention is used to control the propulsion of the carriages 940 along the operational sides of the track paths 910 and 912. The two operational sides are connected and coordinated in a manner to provide total control over each pair of clips as they move through the drawing section and other operational sections.

In a typical application, the web of material or film 961 is formed upstream at 916 and is fed to the tenter frame entrance at 920. The tenter clips on the opposed pairs of carriages grasp sequentially successive areas along opposite edges of the film at 920 and propel it at a first constant speed through the transport section 918 where the film is heated. The tracks then diverge thereby drawing the film transversely while at the same time the opposed pairs of carriages are individually accelerated causing them to separate from adjacent pairs and simultaneously stretch the film longitudinally in the drawing section 922. Heating of the film is continued in the drawing section to control the film temperature during drawing. The tracks are then made parallel and the individual opposed pairs of carriages reach a final speed at the end of the drawing section at 924 and the film is stabilized in section 926. Temperature control of the film continues in the stabilizing section. The film is then released from the tenter clips at the tenter frame exit at 929 and continues to a conventional winder. The individual carriages in each loop are then returned along return sides 903 and 923 of the two endless carriage loops to the entrance 920 of the tenter frame.

As previously described, the carriages may be returned to the beginning of the elongated primaries, or to the entrance 920 of the tenter frame, by oppositely accelerating the synchronous secondaries along the return sides using a mirror image of such primaries for this purpose. An alternate method for accomplishing this task is also shown in our copending U.S. application Ser. No. 115,791, filed Nov. 2, 1987. The teachings of this application are incorporated herein by reference.

Further, if desired, one or more idler clips, not shown, may be placed between each of the tenter clips, in each loop of the tenter frame, to minimize film edge scalloping, as shown, for example, in French Pat. No. 2,317,076. The carriages to which these idler clips are attached are unpowered during the film stretching operation. Such carriages are initially propelled by abutment with the carriages having the synchronous secondaries attached thereto. As these powered carriages separate to stretch the film, the idler clips are then propelled, on the operational sides of the tenter frame, by their engagement with the moving film.

After the film is released, these carriages may then be returned unpowered along the return sides 903 and 923 of the loop by abutment with the propelled carriages or by providing such carriages, to which the idler clips are attached, with hysteresis secondaries, as shown in our copending application Ser. No. 115,791, to power them under control on the return sides. The teachings of this application have previously been incorporated by reference herein.

If it is desired to slacken or relax the film in the machine direction in the drawing or stabilizing sections, the speed of the carriages as controlled by the linear motors may be gradually or progressively decreased according to any desired program thereby providing direct control of the shrinking and flatness of the film. TD relaxation is also possible in the stabilizing section by slightly converging the tenter frame tracks to move the tenter clips closer together laterally.

The symmetry of motion between carriages along the film sides of loop 900 and loop 902 is assured by:

providing a linear motor primary adjacent each track, with each primary including a plurality of groups of coils with the groups of coils in one primary sized to match opposed groups of coils in the other primary and with each of the opposed groups of coils being electrically joined and defining a single control zone;

providing a synchronous secondary attached to each of the carriages, the attached secondary guided adjacent one of the primaries;

providing a continuous supply of closely spaced or abutted carriages to each loop initially in synchronism with matching electromagnetic waves developed in the groups of coils in a control zone at the entrance of the tenter frame; and providing predetermined coordinated control instructions to all coil groups in each control zone of the opposed primaries simultaneously to thereby develop predetermined coordinated EM waves in all control zones so the opposed pairs of carriages in the two loops are propelled in symmetry through each control zone and from one control zone to the next through the tenter frame.

The synchronous secondaries attached to each carriage assures that the carriage will synchronously engage, or lock onto, the electromagnetic wave developed by the primary resulting from the control instructions. Therefore, as long as the carriages are continuously fed to the operational side of the loop, and the opposed groups of coils in each control zone simultaneously receive alternating current developed from the same predetermined control instructions which are simultaneously coordinated with adjacent control zones' instructions, the carriages will remain in symmetry as they are continuously propelled along the operational sides of both loops.

The primary of the linear motor along the operational side of a single loop and the opposed primary with matching opposed groups of coils is similar to the system shown in FIGS. 4 and 13A–D. The control of carriage propulsion along an operational side by predetermining and coordinating the control zone waveforms is similar to the system in FIGS. 13 A–D.

Referring to the block diagram of FIG. 4, the elongated path shown corresponds to one of the two operational track sides for propelling the carriages which path in FIG. 4 typically includes a primary 152 separated into a plurality of sections, namely, first constant velocity section 300, acceleration section 302 and a second constant velocity section 304.

Each of these sections in FIG. 4 is, in turn, divided into a plurality of zones for control. As shown, first section 300 comprises a single zone 308, second section comprises a plurality of zones, such as zones 310–318 and the third section also comprises at least one and preferably a plurality of zones 322–326.

In operation of the tenter frame, the zones of FIG. 4 correspond to groups of coils from the primaries of each operational track section that are sized to match and are directly opposed to each other. These opposed groups of coils are electrically joined and define a single control zone.

The first constant velocity section as at 300 in FIG. 4 and between position zero lambda to seven lambda ($0-7\lambda$) in FIG. 13 A–D corresponds to the first constant speed transport section of the film tenter frame at 918. The carriages are accelerated to space them apart in the MD beginning at about 922 in the drawing section of the tenter frame. This drawing section corresponds to acceleration section 302 in FIG. 4 and position seven lambda to twenty-six lambda ($7-26\lambda$) in FIG. 13 A–D. At the end of the drawing (acceleration) section such as at 924, the carriages are spaced apart at their maximum spacing and the simultaneous biaxial stretching of the film is complete. The second constant velocity section 304 in FIG. 4 and positions twenty-six lambda to fifty-five lambda ($26-55\ \lambda$) in FIGS. 13 A–D correspond to the film stabilization section 926 in FIG. 14. This representation of the film tenter frame is a general simplified case that has numerous variations, some of which will be discussed further.

The control zones for the tenter frame loops comprise opposed groups of coils that are electrically joined. The opposed groups of coils are shown as blocks in both loops such as 930–930' for control zone A, 932–932' for control zone B, 934–934' for control zone C and 936–936' for control zone D. The groups of coils are adjacent the secondaries on the carriages along the operational side of the loops. They correspond to zones such as 308, 312, 314 and 324 in FIG. 4 and zones such as Z1, Z4, Z5 and Z10 in FIGS. 13 A–D. Wherever the carriages are to be spaced apart, the control zones are sized so that for a range of desired operating conditions, there will never be more than one pair of carriages at a time in a control zone as the carriage pairs are propelled in symmetry along the primary. In the first constant velocity control zone 930, however, the carriages are all closely spaced or abutted at an integral multiple of lambda and traveling at the same speed so there can be many carriages in this control zone.

Carriage, Track, and Linear Motor

FIG. 15 shows a typical cross section taken along lines 15—15 in FIG. 14 through the operational side 910 of loop 900. A carriage such as 940 is shown in side elevation. A guide track 942 is provided that runs completely around loop 900 along both operational and return sides and connects the operational and return sides. The track is supported by attachment to frame 962. The carriage is supported on guide track 942 by the eight rollers 944, 946, 948, 950, 952, 954, 956 and 958 that are rotatably mounted on carriage body 960. The rollers are alternately aligned and offset in the MD or longitudinal direction (into FIG. 15) to provide a stable support for the carriage. That is, horizontal track surface rollers 944 and 958 are longitudinally aligned, while horizontal rollers 946 and 956 are also longitudinally aligned but are longitudinally spaced, or offset, from rollers 944 and 958. Likewise, vertical track surface rollers 948 and 952 are longitudinally aligned, while vertical rollers 950 and 954 are also longitudinally aligned but are longitudinally offset from rollers 948 and 952. Other numbers of rollers or sliding elements may be utilized as long as the carriage is stably supported for free sliding or rolling movement along the guide track. Alternate track arrangements are also possible. The rollers keep the carriage closely positioned on the track and carry loads produced by the weight of the carriage, the tension of the film 961 grasped by the film clip, the thrust of the motor, and the unbalanced magnetic forces between the primary and secondary.

Film Clip

Carriage body 960 also has attached a film clip lever 964 pivotably connected at 966. A gripping surface 968 is pivotably movable to clamp the film against anvil surface 970 which stops the pivoting movement. The film is gripped, as shown in FIG. 15, by forcing the lever 964 in the direction of arrow 972 and is released by forcing the lever in the direction of arrow 974. The upper end of lever 964 forms cam following surfaces 963 and 965 that are controlled by cam surfaces along the guide track. In FIG. 14, the surfaces 967 and 969 at the entrance move the lever to grip the film and the surfaces 971 and 973 at the tenter frame exit move the lever to release the film. Suitable tension devices such as springs may be connected between lever 964 and carriage body 960 to maintain the clip in the open and closed position such that the clip is forced into an opposite position only under the action of the cam surfaces. This arrangement is preferred so that cams 967, 969, 971, and 973 only need be placed at the entrance and exit of the tenter frame to open and close the clips. The longitudinal dimension (into FIG. 15) of surface 968 and anvil 970 is narrow to permit free movement of the film as it is stretched between clips. Clips for simultaneous biaxial stretching of film are disclosed in the previously mentioned tenter frame patents and U.S. Pat. No. 3,391,421 and need no further explanation.

Secondaries

On the top and bottom of carriage body 960 are attached synchronous secondaries 976 and 978. They consist of magnets located at 980 and 982 and back iron at 984 and 986 similar to the secondaries 160 and 170 shown in FIG. 2. As such, the magnets at 980 would consist of one magnet oriented with its north pole facing outward and a second adjacent magnet, spaced one lambda away, with its south pole facing outward. As is shown in FIG. 2, referring to secondaries 160 and 170, it is preferred that secondaries on adjacent carriages have the disposition of their poles reversed. Also when adjacent carriages are at their closest spacing, which in the tenter frame invention is with carriage bodies abutted, the magnetic edges of the secondaries would have a one lambda space between them. Referring to a single carriage, the magnet near the forward side of the carriage on the top secondary and the magnet near the forward side of the carriage on the bottom secondary would both have their outward facing poles the same. For example, both top and bottom secondaries would have north poles near the forward side of the carriage.

The magnets are preferably angled with respect to the adjacent primary teeth. This helps to remove force fluctuations on the moving carriages that are caused by attraction of the magnets to the teeth of the laminated primary. The magnets are also preferably surrounded on the sides and top by a non-magnetic, electrically conductive cage such as copper or aluminum to contain the magnets and provide dynamic electromagnetic damping to the moving carriages.

Aligning the Carriage Secondaries

At the entrance to the tenter frame at 920, the clip carriages must enter at a known spacing in synchronism with the EM wave in the first control zone, A. Prior to machine start-up the carriages are pressed up against one another with the carriage bodies 960 abutted and the lead carriage held stationary at say 921. This establishes the spacing at a known unvarying value at which the magnetic pole pitch of the carriage secondaries matches the EM wave pole pitch determined by the coils in the primary; in this case the primary is control zone A. A variety of means can be used to press the carriages together, such as linear motor means, conveyor belt means, gravity means, etc. Since the preferred apparatus has two different polarity carriages as discussed earlier, the proper polarity carriage must be located in both operational sides at 921. For instance, if the starting EM wave requires a north magnet near the forward side of the carriage at 921 in operational side 910, then a north magnet is also required near the forward side of the carriage at 921 in operational side 912. This is true whenever the magnet polarity on adjacent carriage secondaries is reversed as is preferred. Obviously, when alternate polarity carriages like these are used, there must always be an even number of carriages in each loop so this alternating polarity reversal is maintained as the carriages continuously circulate in the loops.

After this pre-start-up orientation of carriages is established, and the remainder of the operational sides of the loops are empty of carriages, the tenter frame can be started up and the carriages will be propelled one after the other along the operational sides in synchronism with the EM waves and returned along the return side as shown in FIG. 14. If the operational side of the tenter frame is stopped in a controlled fashion, the relative positions of the carriages can be maintained and restarting does not require realigning of the carriages.

Primaries

At 988 and 990, above and below the carriage, are the elongated primaries that are divided into control zones. A typical primary structure is shown in FIG. 2 at 182 and 184 and consist generally of coils placed in slots between laminated metal teeth. The predetermined alternating current to the primaries is supplied via conductors at 992 and 994. The use of both upper and lower primaries provides maximum thrust to the carriage by simultaneous propelling of both secondaries 976 and 978. In some sections of the tenter frame where maximum thrust is not required, it may be convenient to omit one of the upper or lower primaries. However, the upper and lower primaries also provide a balanced magnetic attraction force on the carriage so when one is omitted, the vertically disposed rollers on the carriage become more heavily loaded. The primaries are positioned to be closely spaced from the carriage secondaries separated only by clearance gaps 996 and 998.

The frame 962 which directly contacts the backs of the primaries 988 and 990 preferably has channels (not shown) running the length of the primaries for circulating cooling liquid to keep the operating temperature of the primaries down. Further, each primary has its core and end coils potted to provide mechanical protection for the coils and to conduct heat efficiently from the coils to the cooled frame. Potting compounds such as filled epoxies, silicones, or ceramics are suitable as long as they have a temperature resistance and thermal conductivity compatible with the thermal loads imposed on the primaries. A preferred potting procedure is to surround all but one side of the motor with a steel frame, fill the motor with alumina oxide ceramic grit and then apply a two part epoxy resin so the percent fill by volume of the filler is about 80 percent. Such a technique is known for potting transformers. A two part epoxy having a bisphenol-A resin and nadic methyl anhydride (NMA) hardener has been successfully used. The frame preferably remains as an integral part of the motor. Heat in the primary comes primarily from $I^2R$ electrical losses and from heat absorbed from the film heating ovens. Strategically placed shields may provide some additional protection from radiant oven heat.

Referring specifically to FIG. 14, there may be an number of inflection points in the loops, for example, at 921 between the transport and drawing sections and at 924 between the drawing and stabilizing sections. There also may be inflection points at other locations, for example, at those points where the tracks are moved to accommodate angle changes when the tenter frame width is adjusted to fine tune TD draw ratios.

When this occurs and the primaries cross an inflection point it has been found most convenient to omit the primary coils so flexing can freely occur and the wires in the coils are not subjected to repeated bending that eventually causes fatigue and breakage. Omission of the coils also makes it possible to remove sections of primary for maintenance and repair without disturbing the remainder of the primary. The loss of electromagnetic force at an inflection point with omitted coils can be minimized by taking the following steps:
  eliminating one phase-set of coils at the joint;
  powering the coils on either side of the inflection point with the same power waveform;
  providing overlapping back-iron at the inflection point.

A significant aspect of the second step is that a control zone boundary will never occur at an inflection point since both sides of the inflection point are powered by the same waveform, i.e., one from a single control zone.

Overlapping back-iron between separate primaries is achieved by providing a cut-out in the back side of one primary and providing a corresponding extending element protruding from the back side of the adjacent primary. As the primaries pivot relative to one another at an inflection point, the protruding element of the one primary moves within the cut-out of the other primary while maintaining the overlapping of the back-irons.

The break in the primary should preferably occur at a slot and not at a tooth. The tooth must remain undisturbed since it is a critical element in the flux path to the secondary. To minimize the distortion in the EM waveform, the current in the same phase coils on either side of the joint must have the same frequency, phase, and amplitude. This will produce the proper "consequent pole" at these teeth. To insure this condition, the coils on both sides of the joint are preferably powered by the same source of three phase AC; that is, they are part of the same control zone. This eliminates possibilities of phase shifts that might occur if each section of primary on either side of an inflection point were driven by their own separate three phase power sources.

Control Zones

Along the operational side of the tenter frame, each primary includes a plurality of groups of coils with the groups of coils in one primary sized to match the groups of coils in the other primary and with each of the opposed groups of coils being electrically joined and defining a single control zone. Such control zones are independently controlled and the groups of coils therein all receive matching or the same driver instructions simultaneously. In the previous discussion of the linear synchronous motor system of FIG. 4 for a single primary, a zone consisted of only a single group of coil windings which required a zone driver and a zone controller for independent control of that single group of coil windings. A control zone as discussed in describing the tenter frame consists of opposed groups of coil windings.

A control zone for the primaries of both loops preferably consist of four groups of primary coils. Referring to control zone C comprising groups of coils 934–934', it consists of a first group of upper coils and a second group of lower coils in operational side 910, and a third group of upper coils and a fourth group of lower coils in operational side 912. The groups of coils in control zone C are electrically joined to zone driver means 1000. This driver means may consist of a single zone driver such as 144 shown schematically in FIG. 1 and in detail in FIG. 8, or two zone drivers, one for the upper and lower coil groups in each operational side, or four zone drivers, one for each group of coils in the control zone. The choice of how many zone drivers to use depends on the power match between the power requirements of each group of coils versus the power rating of a zone driver. The groups of coils may be electrically connected to the zone driver or drivers in series, parallel, or series/parallel which also depends on the above power match. What is important is that a zone controller means such as 1002 for control zone C be common for all the zone drivers for that zone. This zone controller means may be a single zone controller as at 132 in FIG. 1 and shown in detail in FIG. 5, or, for controller capacity reasons, it may be two or more zone controllers that have identical control instructions stored in each. When, in a preferred embodiment, zone driver means 1000 consists of a single zone driver, and zone controller means 1002 consists of a single zone controller, and the coils such as 146 in FIG. 1 represents all four groups of coils in the tenter frame control zone, then FIG. 1 depicts a representative portion of the control system for the linear motor film tenter frame.

It is also contemplated that part of a control zone within a single primary coil group, such as the lower primary of operational side 910 of constant speed zone A, can be divided into subgroups of coils with each subgroup powered by separate zone drivers. These zone drivers, however, would all receive the same instructions simultaneously from one or more zone controllers when those subgroups of coils are all operated as a single control zone.

Just as representative control zone C is connected to a zone driver means and zone controller means, so are representative control zones such as A, B, and D connected respectively to zone drivers 1004, 1006, and 1008 and zone controllers 1010, 1012, and 1014. Similarly to FIG. 1, all the zone controllers are connected to a central controller 1016 which corresponds to central controller 108 and central programmable timebase 106 in FIG. 1. The central controller and zone controllers are also in communication with a system computer 1018, corresponding to system computer 100 in FIG. 1, which for clarity in FIG. 14 is shown only connected to central controller 1016.

Zone Drivers

It is important that sufficient current be present in each control zone to propel the carriages around the loops A zone driver utilizing voltage control suitable for this purpose is described in our previously mentioned U.S. Pat. No. 4,675,582.

Figure 16:
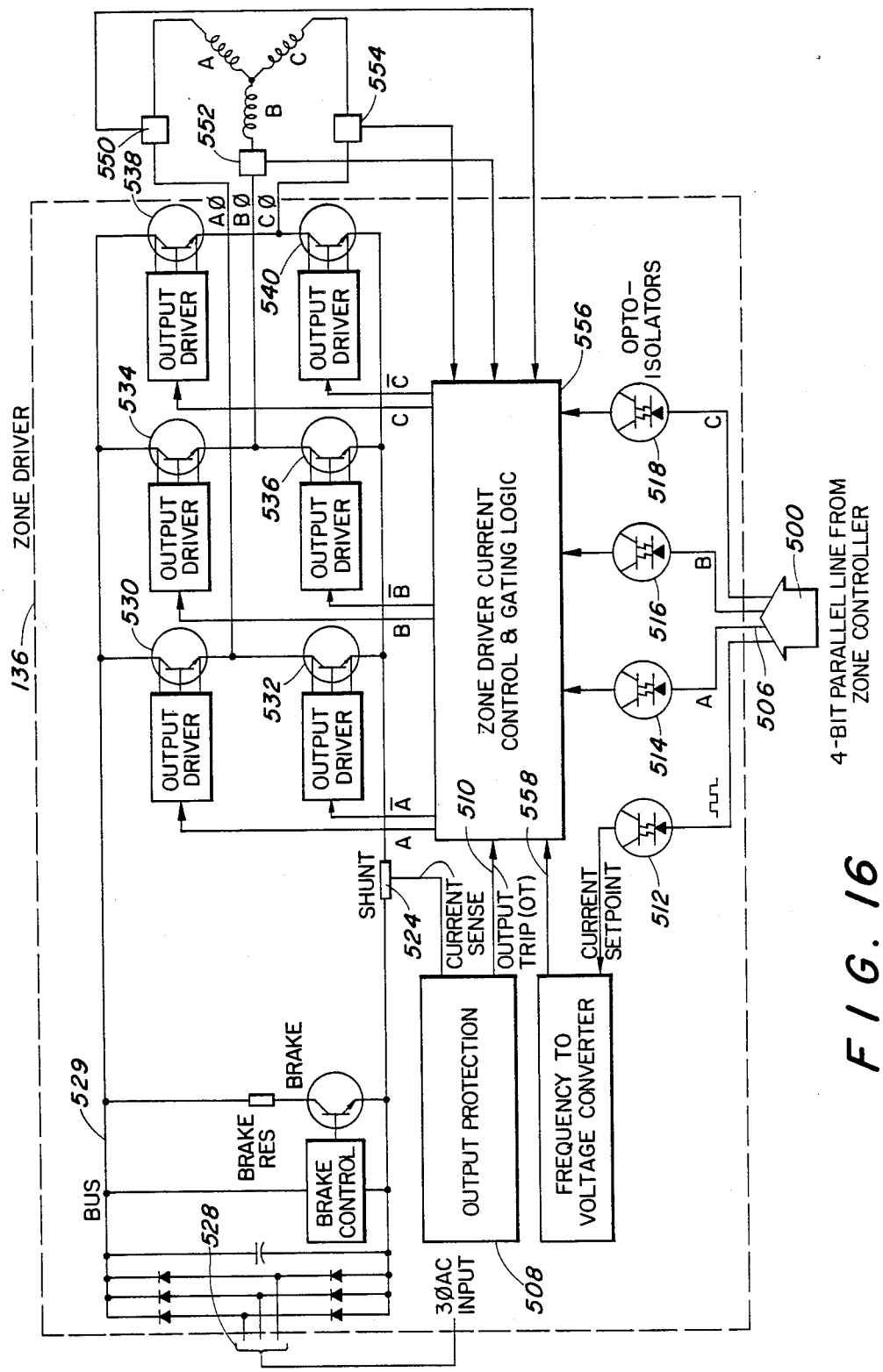
FIG. 16 is a schematic view of a modified version of the control zone driver shown in FIG. 8.

While this driver is very effective in propelling the carriages, it has been found that a driver utilizing current control can also be used to assure that there is always adequate current in the zones. The driver of FIG. 8 can be appropriately modified for this purpose. Such improved driver, which is shown in schematic form in FIG. 16, provides rapid response constant current control for this system. A similar type motor driver with the addition of a flux responsive circuit is also described in U.S. Pat. No. 4,259,620, which is hereby incorporated herein by reference.

The problem the modified driver solves is the following. When a pair of synchronous secondaries propelled in the dual loops of the tenter enter an empty (no secondaries present over the coils) control zone, two things happen to vary the current. One, it is believed a back-emf is induced in the coils of that control zone and two, the inductance of the zone is increased by the presence of the secondary over the coils. These effects cause a sudden momentary drop in the current flowing in the coils of that control zone and consequently reduces the electromagnetic force engaging the secondaries. This problem is more pronounced at high secondary (carriage) speeds and in a small control zone that has a small lambda length compared to the lambda length of the secondary. It is also more pronounced in more powerful synchronous motors with a high inductive coupling between the secondaries and primary. Rapid changes in current when a secondary enters a control zone effectively imparts a momentary force pulse to the carriage thereby causing oscillations. In extreme cases the oscillation may cause the secondaries to lose synchronism with the EM wave of the control zone and therefore stop the carriages. This problem can be overcome by providing a rapid response current control system to react to the back-emf and inductance change rapidly, and compensate by increasing the available power to the coils.

Rapid response current control can be accomplished by the following:

providing a high available voltage to the driver switching transistors;

sensing a current indicative of the current output by the transistors and determining the difference between the sensed current and a desired current level, and;

interrupting, based on the difference, the instructions for turning the transistors "on" to thereby regulate the current output of the driver to maintain the coil currents at the desired level.

Additionally, the following step can be included:

limiting the interrupting to a rate which is less than the switching limit of the transistors to thereby avoid transistor overheating.

FIG. 16 shows an improved zone driver similar to the driver shown in FIG. 8. The voltage control circuitry that provided a reduced voltage on second bus 531 (FIG. 8) has been omitted, so now there is only a single high voltage bus 529. Current sensors 550, 552 and 554 have been added to sense currents directly in phase coils A, B and C respectively. Output from the sensors is directed to a new zone driver current control and gating logic 556 that replaces zone driver gating logic 520 in FIG. 8. Output protection is still provided from 508 on line 510. The voltage setpoint and frequency to voltage converter of FIG. 8 is shown in FIG. 14 operatively separated from 508 and is now used to set the current control setpoint on line 558 to new circuit 556.

Figure 17:
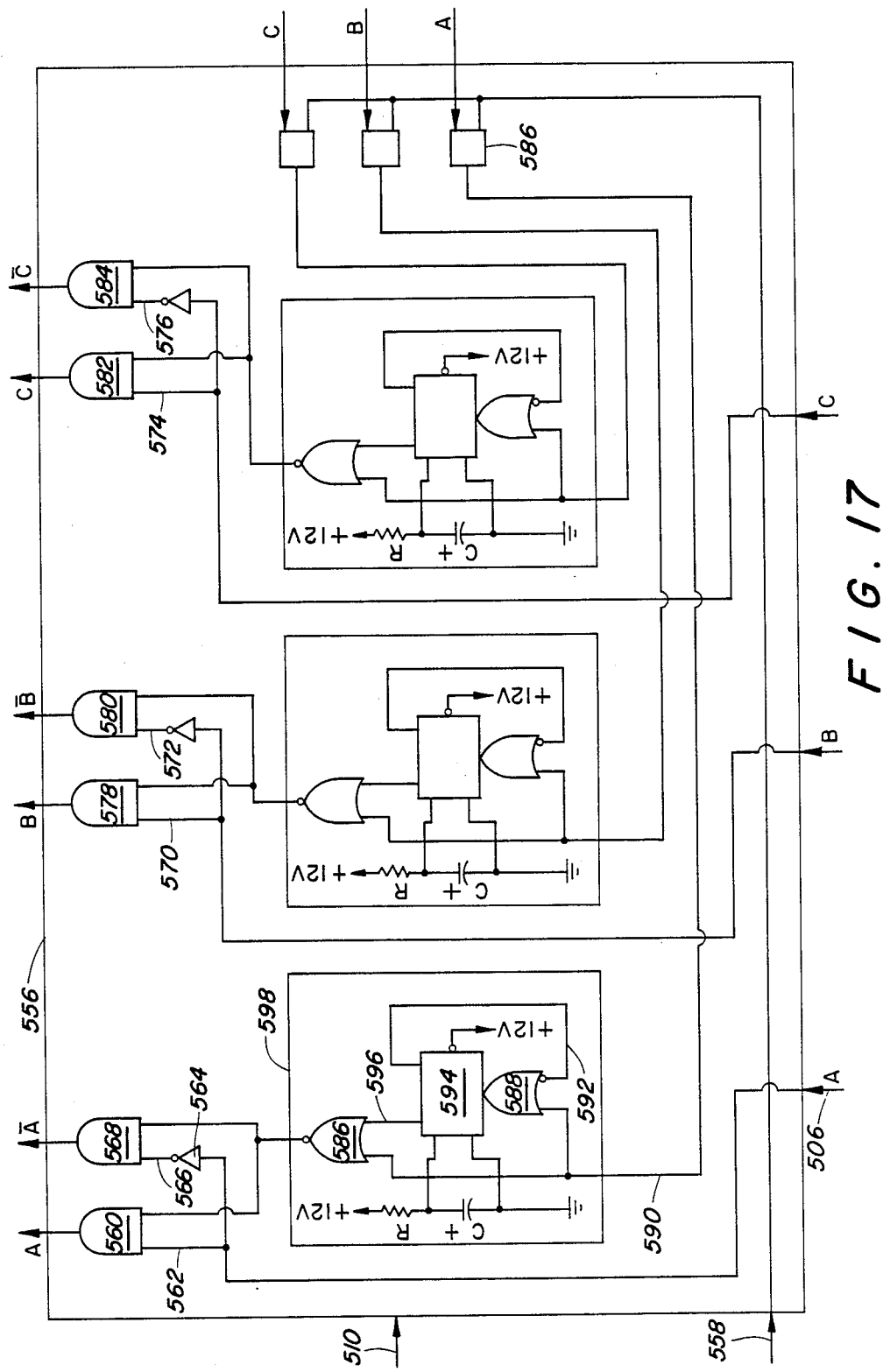
FIG. 17 is a detailed view of the zone driver current control and gating shown in FIG. 16.

FIG. 17 shows the zone driver current control and gating logic 556. On the right side of the Figure is shown the inputs from the A, B and C phase current sensors. At the bottom of the figure are the 3 bits of control information for the A, B and C phases input from the zone controller along logic line 500. At the left of the figure is the input for the current setpoint for all three phases on line 558 and the output protection control on line 510. The output protection is present to prevent damaging current conditions that might develop from failed drive components and is not the subject of this invention, so its operation is omitted for clarity. At the top of the figure, the output lines from the circuit 556 are shown for the upper and lower transistors for each phase designated A, $\overline{A}$ and B, $\overline{B}$ and C, $\overline{C}$. The current control of the invention is accomplished along these phase control lines as will be explained.

All three phase currents are sensed and controlled independently, so the explanation for one phase will apply to the other two as well. The A phase current control is shown on the left side of FIG. 17. The phase control information for phase A is fed in on line 506 and provides one input to the base of AND gate 560 on line 562. It also is inverted by inverter 564 on line 566 and provides one input to the base of AND gate 568. The information on these lines 562 and 566 provides the desired, predetermined switching pattern for the upper and lower A phase power transistors 530 and 532 (FIG.

16) respectively. Likewise, the information on lines 570 and 572 provides the predetermined switching pattern for the B phase transistors and the information on lines 574 and 576 provides the predetermined switching pattern for the C phase transistors. Depending on the actual current level in the phase, however, this predetermined switching pattern may be interrupted by the current control circuit that provides the other input to the bases of the AND gates 560, 568, 578, 580, 582 and 584.

The current control circuit will now be explained, once again referring to the A phase, but it applies to all three. The desired current level reference signal is applied on line 558 as one input to the base of the A phase comparator 586. The actual current sensed flowing through the A phase coil is applied as the other input to comparator 586. Within the comparator is circuitry for deadband limits for the reference current.

The comparator determines the difference between the sensed current and the desired reference current deadband. If the sensed current is less than the lower deadband limit of the reference, the output of the comparator is low; if the sensed current is greater than the upper deadband limit of the reference, the comparator output is high. If the sensed current is within the deadband limits, the last output from the comparator continues. The comparator output is one of the inputs on line 590 to the two logic gates 586 and 588 of the A phase current control rate limiting circuit 598.

Since a high voltage is always present on bus 529 to provide the desired current, yet a high voltage is only occasionally required, the current signal is frequently above limits. Therefore, the current control circuit is frequently turning the power transistors off and on to try to keep the current within the deadband limits. To protect the power transistors from excessive switching rates that are normally determined by the L/R time constant for the phase coils, a switching rate limit is incorporated into the current control circuit. Excessive switching rates cause overheating when added to the normal transistor heat load and must therefore be avoided.

The current signal to logic gate 588 is compared to the last signal received which is present on line 592. This OR gate comparison feeds a non-retriggerable logic circuit, 594. When the inputs are different, as they would be for example if the current is "on" to a transistor and the level goes above the upper deadband limit, the chip logic feeds a signal out to line 596 subject to a timing circuit represented by RC elements shown. The logic circuit 594 prevents the timer from starting over again due to a state change until it has completely timed out. This timing circuit 598 limits the switching rate that the current control circuit can implement to thereby protect the power transistors from excessive switching at high currents. The output from NOR gate 586 is inverted and becomes the other input to the base of AND gates 560 and 568. A typical IC chip 594 useful for this circuit is a Motorola non-retriggerable "one shot" chip, part no. MC145388 from Motorola Inc., Austin, Tex.

Figure 18:
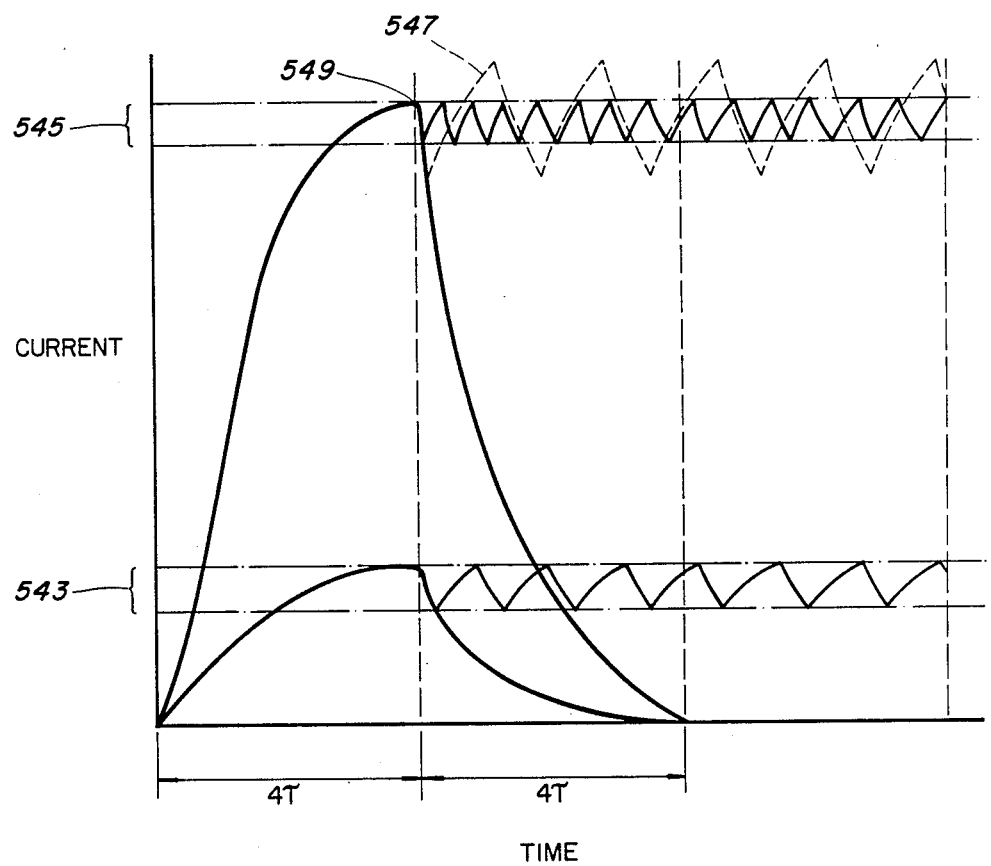
FIG. 18 is a representative plot of current vs. time output showing how the switching rate of the transistors is limited.

As mentioned, the current control circuit switching rate naturally seeks a level determined by the L/R time constant which varies the magnitude of the current, but this has been limited by the rate limiting circuit provided. The result of this is shown in FIG. 18 where a typical time plot of current applied to an inductive load is seen. A voltage bus powering the typical induction load is sufficient to drive a current through the load that exceeds the desired current. For different operating conditions, such as for start-up and for high speed continuous operation, the current level may be set low or high or somewhere in between. For a low and a high current, the current builds up and decays in about four time constants. However, for the high current the curve at initial turn-on and turn-off is much steeper than for the low current since the high current must rise to and fall from a higher level in the same time as the low current. Rise and fall of the high current within its deadband will be much faster than the low current for the same deadband. Therefore, the number of switchings naturally occurring per unit time will be greater for the high current. When the same deadband limits are applied to both current levels, the results are shown for the low current at 543 and for the high current at 545. As can be seen, the natural on-off rate for the high current is much more frequent than for the low current. The low current rate may be acceptable, but the high current rate will cause excessive heating in the power transistors. When the rate limit logic of the current control circuit is applied, the high current trace will resemble the dashed trace at 547.

In operation, when the instructions on line 506 call for the current in the A phase to be "on", the current rises due to the excess voltage on bus 529 until it exceeds the upper deadband limit, such as at 549, at which time the comparator output goes high on line 590 to rate limiting circuit 598. If the time since the last comparator state has expired, the rate limiting circuit outputs a signal to the AND gates 560 and 568 that interrupts the "on" instruction for the A phase current and the rate limiting circuit 598 starts timing this new state. The current in the A phase coils then starts to decay and drops down to the lower deadband at which time the comparator output goes low. If the rate limiting time has expired, the "on" instructions for current can be un-interrupted and current to the coils will be turned on. If the rate limiting time has not expired, the "on" instructions are still interrupted and the current continues decaying until the time has expired. In this latter case, the current trace resembles the dashed lines that rise above and below the deadband limits.

Referring to the dashed line trace, the rate has been limited to an acceptable level now, but the current swing is somewhat greater than the original deadband limits. In effect, the narrow deadband limits for the high current level where the rate limit logic was utilized have been broadened to control the excessive switching rate, thereby preventing overheating of the power transistors. If low currents are selected for the drive, however, the narrow deadband limits may be the controlling factor in determining the switching rate thereby allowing rapid response even at low currents. This method of establishing rate limiting is preferred to fixed deadband limits that must be readjusted for different current levels to be effective in limiting high currents without the same deadband limits slowing the current response at low limits. This method of limiting allows the drive to provide maximum current response whatever current level is selected for a particular set of operating conditions.

The preferred circuits shown have been for providing rapid response current control in a transistorized inverter type drive having predetermined, remote source, phase control instructions. However, other means may be used within the scope of the invention for providing an excessive voltage bus and limiting the current by interrupting the predetermined instructions at a controlled rate. A simplification of the circuit explained which employs only a single current sensor on the positive DC bus, and omits the "AND" gates on the $\bar{A}$, $\bar{B}$, and $\bar{C}$ switching lines to the transistors (much like the circuit in the '620 patent) would also accomplish the same control. With an effective rapid response current control circuit, the current to the coils of a control zone can be rapidly controlled to keep the current at the desired level thus avoiding sometimes undesirable oscillations in the motion of the active carriages.

Zone Controllers

The zone controllers in the tenter frame control system are all structured according to FIG. 5 to include a first steady state memory such as 404 to operate a control zone at a first steady state operating condition; a second steady state memory such as 412 to operate the control zone at a second steady state operating condition; and a third transition memory such as 408 to operate the control zone to achieve a transition from the first steady state to the second steady state operating condition. In the tenter frame, this ability to change from one steady state operating condition to another permits the tenter frame to change the MD draw ratio from one continuous operating draw ratio to another while continuing to draw the web of material without stopping.

Variable Draw Ratios

This particular feature, i.e. to be able to readily change operating states, i.e. draw ratios, for the control zones without stopping the propulsion of the tenter clip carriages through the control zones, provides unique capabilities to the tenter frame of the invention. First, it allows the tenter frame to be started up, and the film first threaded through, at a low first steady state simultaneous biaxial draw ratio and then, while continuously drawing the film, change to a higher steady state simultaneous biaxial draw ratio. Second, it permits fine tuning the simultaneous biaxial draw ratio during operation to optimize the process and achieve film quality not possible before since prior art simultaneous biaxial tenter frames can only make incremental MD draw ratio changes by lengthy and costly shut downs and start-ups of the line.

TD drawing of the film can also be adjusted and fine tuned during operation by intermittently driving adjusting screws, such as 907, which move the loops toward and away from each other. The tracks flex and slide at the loop inflection points to accommodate the angle changes. Such lateral adjustment features are known in U.S. Pat. No. 3,150,433. The screws and pivotally mounted nuts for adjusting the tenter frame width have a right hand threaded screw segment, such as 911, and nuts, such as 913 and 915, for one of the loops and a left hand threaded screw segment, such as 917, and nuts, such as 919 and 909, for the other loop. In this way rotation of an axially fixed screw, such as 907, moves the two loops in opposite directions toward and away from each other. A motor, such as 905, attached to the screws and controlled by the operator accomplishes rotation of the screws prior to and during tenter frame operation. When desirable, then, both D and TD draw ratios can be varied while continuing to simultaneously biaxially draw the web.

At low MD and TD draw ratios it is relatively easy to thread up the film whereas at high draw ratios it is common to experience film tearing and breakage with numerous film polymers, such as polyethylene terephthalate films.

After the film is running at the low MD and TD draw ratio, it is possible with the apparatus of the invention to increase the TD draw by adjusting the tenter frame width and increase the MD draw by switching control of the tenter clips to a third transition operating condition where the MD draw ratio is continuously changing until it reaches a second steady state MD draw ratio. Then the control system can switch control of the tenter clips to the second steady state MD draw ratio to operate continuously. This permits running at a high simultaneous biaxial MD draw ratio which was not possible in prior art tenter frames because they operate at only one fixed simultaneous biaxial MD draw ratio which cannot be threaded up when it is a high draw ratio. High simultaneous biaxial MD draw ratios are those that exceed $3\times$, or preferably $5\times$, or more preferably $7\times$, and most preferably $9\times$. This results in a simultaneously biaxially drawn film that was not possible to make continuously in a single stage draw before. By single stage is meant within a single draw section of a tenter frame.

Sequential Drawing

From the above it will be seen that in accordance with the present invention longitudinal drawing of a film may be precisely regulated due to the use of a plurality of linear motor powered carriage pairs individually controlled independent of other pairs with respect to longitudinal movement thereof. Thus, biaxial drawing of the film may be accomplished simultaneously as described or it may be accomplished sequentially as well. In sequential drawing lateral drawing precedes longitudinal drawing or vice versa. If it is desired to laterally draw the film prior to longitudinal drawing, the speed of the carriages in the diverging portions of the guide tracks is maintained constant such that only lateral drawing is accomplished and thereafter in the stabilization section the speed of the carriages is progressively increased to longitudinally draw the film. If this mode of operation is desired the size of some of the groups of coils as shown in the control zones of FIG. 14 would have to be redesigned so when the carriages are to be spaced apart, there is never more than one pair of carriages at a time in a control zone. In order to longitudinally draw the film prior to lateral drawing, the guide tracks in the first part of the drawing section are readjusted to continue parallel and the speed of the carriages is progressively increased in the parallel part of the drawing section to provide longitudinal drawing, and thereafter the speed of the carriages remains constant as the track diverges in the remainder of the drawing section to achieve only lateral drawing. Furthermore, if only longitudinal drawing is required with no lateral drawing, the guide tracks from 921 to 929 may be maintained parallel thereby not providing any lateral drawing of the film. Also, if only lateral drawing is required with no longitudinal drawing, the tracks would diverge as in FIG. 14, but the carriages would all travel at a constant speed without being spaced apart throughout the entire operational side of the tenter frame.

MD Simultaneous Stretching Variations

The advantages obtained by the present invention stem substantially from the elongated stationary primaries divided into control zones which control zones operate on moving pairs of synchronous secondaries of linear motors to impart predetermined speeds to carriages carrying the secondaries and tenter clips along the primaries. Thus, since each pair of carriages is independently propelled (that is, precisely movable independent of the other carriage pairs) an acceleration program may be determined for superposing on the lateral drawing a predetermined, controlled, longitudinal drawing. Accordingly, the longitudinal displacement applied to the film during its movement through the drawing section may be precisely regulated at all times; and, similarly, the speed of the film in the transport and stabilizing sections may be precisely controlled. Wherever the carriages are to be separated, the control zone lengths are selected so there is never more than one carriage at a time in a group of coils in a primary of a control zone. Then, by predetermining the frequency and phase supplied to each primary zone, any desired drawing of the film can be achieved, such as varying the MD draw rate and the ratio of amount and rate of MD to TD draw within the stretch section. For instance, the MD strain rate during simultaneous biaxial stretching of the film can be controlled at various positions in the drawing section of the tenter frame. The strain rate, or instantaneous strain rate, occurring between two adjacent clips at two different times during stretching is defined by the following:

$$\text{strain rate } (SR) = \left( \frac{L2}{L0} - \frac{L1}{L0} \right) \times 100\%/(t2 - t1)$$

SR = % strain per minute where:
L0 = length of unstretched film between two adjacent clips at time = t0 = 0, at the beginning of stretch.
L1 = length of stretched film between two adjacent clips at time = t1.
L2 = length of stretched film between two adjacent clips at time = t2.

The average strain rate (ASR) is a special case of the strain rate where the stretch is measured from an unstretched condition at 50 to a fully stretched condition at 52. In this case, L1 = L0; t1 = t0; and t2 − t0 = total stretching time. This results in the following:

average strain rate $$(ASR) = \left( \frac{L2}{L0} - \frac{L0}{L0} \right) \times 100\%/(t2 - t0)$$

$$(ASR) = \left( \frac{L2}{L0} - 1 \right) \times 100\%/\text{time to stretch}$$

The strain rate can be controlled to be a constant value throughout MD simultaneous stretching, or it can progressively increase during MD simultaneous stretching, or it can rapidly increase and then progressively decrease during simultaneous stretching. Compared to commercially known tenter frames the tenter frame of the invention can produce strain rates two to three times greater. This is because for any given MD drawing distance and strain rate control, the tenter frame of the invention can run at operational speeds two to three and sometimes ten times greater than any prior art tenter frame for simultaneous biaxial stretching. For instance, commercial versions of the tenter frame of previously mentioned U.S. Pat. No. 3,150,433 can only achieve continuous operating film exit speeds of less than about 500 feet per minute. The tenter frame of the invention can achieve operating film exit speeds of about 1200 feet per minute. When drawing a film at that exit speed and a 5×MD simultaneous biaxial draw ratio in about a nine foot distance at a constant MD strain rate, the result is an average MD strain rate of about 32,000% per minute.

In order to more fully appreciate the merits of the invention, polymeric films were biaxially drawn simultaneously in the MD and TD directions on the linear synchronous motor tenter frame of the invention using varying speeds, various draw ratios, etc. Although, in prior art machines, biaxially drawing film simultaneously in both directions has been achieved, not until the drawing of film on the described apparatus will one be able to readily vary the absolutely simultaneous biaxial draw ratio to obtain the outstanding properties of the films of the present invention—films that are biaxially drawn absolutely simultaneously in both directions without prestretching in the machine direction, or biaxially drawn in a precisely predetermined controlled manner.

Thus, films can be drawn at least 3× in both directions at strain rates of from 10,000%/minute to strain rates as high as 60,000%/minute. Preferred films can be drawn at least 5×; the most preferred films can be drawn at least 7× and most preferred can be drawn at least 9×. The films can be any of the following materials: polyesters, e.g., polyethylene terephthalate and polybutylene terephthalate, polyamides, polyacrylates, polyolefins, e.g., low and high density polyethylene, polypropylene, etc., propylene-ethylene copolymers, polycarbonates, polyvinyl chloride, polystyrene, polyurethanes, polyinyl alcohol, polyvinylfluoride, polyacrylonitrile, polyimides, copolymers of ethylene and vinyl alcohol, polyphenylene sulfides, copolymers of vinylidene chloride and vinyl chloride and copolymers of ethylene with olefinically unsaturated monomers such as vinyl acetate, methyl methacrylate, ethyl methacrylate, ethyl acrylate, methyl acrylate, acrylonitrile, methacrylic acid or acrylic acid and ionomers thereof.

Biaxially oriented polyethylene terephthalate film prepared by the process of this invention is particularly preferred herein and may possess many unexpectedly good characteristics such as high mechanical strength, very low heat shrinkage, and excellent dimensional stability that make it an outstanding candidate for use as a base film in magnetic recording tapes and disks, capacitors, etc. This is particularly true for those films biaxially drawn as high as 5× or 7×.

The terms and expressions which are employed herein are used as terms of expression and not of limitation. And there is no intention, in the use of such terms and expressions, of excluding the equivalence of the feature shown, and described, or portions thereof, it being recognized that various modifications are possible in the scope of the invention.

We claim:

1. Apparatus for continuously drawing a web of material by propelling individual carriages having tenter clips attached thereto at predetermined speeds in endless elongated paths defined by a pair of carriage guide tracks positioned opposite each other, using a linear motor, such linear motor comprising:

a primary positioned adjacent each track, each primary including a plurality of groups of coils with the groups of coils in one primary sized to match opposed groups of coils in the other primary and with each of the opposed groups of coils being electrically joined and defining a single control zone;

a synchronous secondary attached to each of the carriages;

means for simultaneously developing matching waveforms to the opposed groups of coils in each control zone, the waveforms for a control zone having specific predetermined frequency and phase characteristics for developing matching traveling electromagnetic waves in the opposed groups of coils in said control zone, whereby the synchronous secondaries attached to the carriages adjacent a control zone synchronously engage the matching traveling electromagnetic waves developed in the opposed groups of coils in the control zone to propel the carriages in opposed pairs in symmetry through said control zone.

2. Apparatus of claim 1 wherein the predetermined waveform characteristics to a control zone are adapted to cause the developed electromagnetic waves in said control zone to simultaneously propel an opposed pair of carriages at a time completely through said control zone, and the waveform characteristics to said control zone are coordinated in a predetermined manner with the waveform characteristics to each adjacent control zone, and further including, a timing means connected to the means for simultaneously developing matching waveforms, the timing means adapted to simultaneously control the waveform developing means for each control zone such that the coordination of waveform characteristics between control zones results in the continuous propelling of carriage pairs with attached secondaries synchronously through each control zone and from one control zone to the next.

3. Apparatus of claim 2 including:

means for altering in all control zones simultaneously the specific predetermined frequency and phase characteristics for developing the waveforms to a control zone.

4. Apparatus of claim 3, wherein the means for simultaneously altering the specific predetermined frequency and phase characteristics for developing the waveforms to a zone includes for each control zone:

means for developing a first waveform, means for developing a second waveform, and means for developing a third waveform for transitioning from the first to the second waveform, and the apparatus further includes central controller means for selecting the means for developing a waveform in each of the control zones, the central controller means connected to the waveform developing means for each control zone, and including said timing means to thereby simultaneously select the waveform developing means to each control zone;

a computer for providing overall control, and for providing the means for developing waveforms for each control zone with that control zone's specific predetermined frequency and phase characteristics, and for providing control information to the central controller means.

5. Apparatus of claim 2, wherein the speed of the matching traveling electromagnetic waves developed in the opposed groups of coils in each control zone varies whereby the carriages may be propelled in opposing pairs from a first speed in one control zone to a higher speed in another control zone, thereby separating adjacent carriage pairs and stretching the web in the machine or longitudinal direction.

6. Apparatus for continuously drawing a web of material in a tenter frame by propelling individual carriages with tenter clips attached thereto at predetermined speeds in endless paths defined by a pair of guide tracks positioned opposite each other equidistant from a centerline between the tracks, using a linear motor, such tenter frame including:

a pair of endless tracks each having first portions defining a transport section for transporting said web without stretching, second portions defining a section for stretching said web, and third portions defining a section for stabilizing said web;

said tracks also having fourth portions not associated with said web which connect the third portions to the first portions of the tracks;

a plurality of carriages guided by the tracks, said carriages having tenter clips attached thereto for gripping the edges of the web during its movement through the first, second and third portions of the tenter frame;

said linear motor including a primary positioned adjacent each track of said pair of tracks, each primary including a plurality of groups of coils with the groups of coils in one primary sized to match opposed groups of coils in the other primary and with each of the opposed groups of coils being electrically joined and defining a single control zone;

a synchronous secondary attached to each of the carriages;

means for simultaneously developing matching waveforms to the opposed groups of coils in each control zone, said waveforms for a control zone having specific predetermined frequency and phase characteristics for developing matching traveling electromagnetic waves in the opposed groups of coils in said control zone, wherein the speeds of the matching traveling electromagnetic waves developed in the opposed groups of coils in each control zone varies, whereby the synchronous secondaries attached to the carriages adjacent a control zone synchronously engage the matching traveling electromagnetic waves developed in the opposed groups of coils in said control zone to propel the carriages in opposed pairs in symmetry through said control zone from a first speed in one control zone to a higher speed in another control zone, to stretch the web.

7. Apparatus of claim 6 wherein each primary further includes:

a first constant velocity section, an acceleration section, and a final velocity section;

the first constant velocity sections of the primaries being adjacent the first portions of the tracks which define the transport section, the acceleration sections being adjacent the second portions of the tracks which define the drawing section, the final velocity sections being adjacent the third portions of the tracks which define the stabilizing section, wherein the first constant velocity sections of the primaries have groups of coils opposite each other which define at least one control zone in said transport section, wherein the acceleration sections of the primaries have groups of coils opposite each other which define a plurality of control zones in said drawing section, wherein the final velocity sections of the primaries have groups of coils opposite each other which define at least one control zone in said stabilizing section, means for independently developing matching electromagnetic waves in each control zone which propel a pair of secondaries and the carriages with tenter clips attached thereto at predetermined speeds in each control zone, and wherein matching electromagnetic waves developed in a control zone in the transport section propel the carriages, in pairs, at a first constant speed in such section and, matching electromagnetic waves developed in each of the control zones in the acceleration section propel the carriages, in pairs, from the first constant speed to a speed greater than the first speed whereby to progressively space the carriages apart and thereby stretch the web in a machine or longitudinal direction.

8. Apparatus of claim 7, wherein the second portions of the tracks defining the drawing section diverge from the center line whereby the web is simultaneously drawn in both the longitudinal and transverse directions in this section.

9. Apparatus of claim 7, wherein the carriages are in an abutting relationship with each other in their movement through the transport section.

10. A process for continuously drawing a web of film by propelling individual carriages having tenter clips attached thereto at predetermined speeds in endless elongated paths defined by a pair of carriage guide tracks positioned opposite each other equidistant from a center line between the tracks, using a linear motor, including the steps of:

positioning a linear motor primary adjacent each track, each primary including a plurality of groups of coils with the groups of coils in one primary sized to match opposed groups of coils in the other primary and with each of the opposed groups of coils being electrically joined and defining a single control zone;

providing a synchronous secondary attached to each of the carriages;

simultaneously developing matching waveforms to the opposed groups of coils in each control zone, such waveforms for a control zone having specific predetermined frequency and phase characteristics for developing matching traveling electromagnetic waves in the opposed groups of coils in each control zone, synchronously engaging the secondaries attached to a pair of opposed carriages with the matching electromagnetic waves developed in a control zone at the entrance of the tenter frame;

gripping opposite edges of the film with symmetrically opposed pairs of clips attached to the carriages;

propelling an opposed pair of carriages, one pair at a time, completely through a control zone and coordinating the waveform characteristics to that control zone in a predetermined manner with the waveform characteristics to each adjacent control zone, whereby such coordinating includes simultaneously controlling the waveform developing to all of the control zones, whereby the waveform developing and coordinating results in the continuous propelling of a pair of carriages with attached secondaries synchronously through each control zone and from one control zone to the next control zone.

11. The process of claim 10, wherein the predetermined frequency and phase characteristics of the waveform to each control zone are developed to cause the frequency to vary from a first level to a second level to accelerate each pair of carriages relative to an adjacent pair of carriages to thereby draw the web in the machine or longitudinal direction as the carriages are propelled through the tenter frame.

12. The process of claim 11, wherein the second level is greater than the first level to thereby stretch the web in the machine direction as it is propelled through the tenter frame.

13. The process of claim 12, including the step of:
altering said predetermined frequency and phase characteristics while the carriages are being continuously propelled to thereby change the draw ratio of the web while maintaining the propelling of the carriages and the web.

14. The process of claim 12, wherein the step of propelling the carriages includes the step of:
moving the carriages laterally away from the centerline extending equidistant therebetween as the carriages are propelled through the tenter frame to also draw the film in a transverse direction as the film is drawn in the longitudinal direction and thereby simultaneously biaxially draw or stretch the film.

15. The process of claim 13, wherein the step of propelling the carriages includes the step of:
moving the carriages laterally away from the centerline between the opposed guide tracks as the carriages are propelled through the tenter frame to also draw the film in a transverse direction as the film is drawn in the machine direction, to thereby simultaneously biaxially draw or stretch the film.

16. A film product made by the process of claims 14 or 15, wherein the film is simultaneously biaxially stretched and wherein the film strain rate in the longitudinal direction exceeds 10,000% minute.

17. A film product made by the process of claim 15, wherein the film is a biaxially oriented polyethylene terephthalate film that was simultaneously biaxially drawn at a machine direction draw ratio exceeding four and a transverse machine direction draw ratio exceeding two.

18. A film product as in claim 14 or 15 wherein the film is a polyester film and the draw ratio in the longitudinal direction is at least $3\times$.

19. A film product as in claim 16 wherein the film is a polyester film and the draw ratio in the longitudinal direction is at least $5\times$.

20. A film product as in claim 16 wherein the film is a polyester film and the draw ratio in the longitudinal direction is at least $7\times$.

21. A film product as in claim 16 wherein the film is a polyester film and the draw ratio in the longitudinal direction is at least $9\times$.

22. A process of controlling the movement of a plurality of carriages, in opposed endless loops, using linear motors having synchronous secondaries attached to the carriages, including the steps of:

positioning a linear motor primary adjacent each loop, developing in each linear motor primary a plurality of electromagnetic waves that are coordinated in time in a precisely predetermined manner, with the electromagnetic waves in one loop matching the respective, opposed electromagnetic waves in the other loop, and synchronously engaging the synchronous secondaries attached to the carriages with the electromagnetic waves to propel the carriages throughout the endless loops.

23. A process of drawing a web of film in a tenter frame with independently propelled tenter clips including the steps of propelling such clips in opposed loops in paired symmetry using synchronous linear motors wherein synchronous secondaries are attached to the clips; grasping the edges of the film with the tenter clips; and, drawing the film.

24. The process of claim 10 wherein current to the coils in a control zone can be rapidly changed by detecting a difference between an actual current and a desired current and interrupting the current input to thereby regulate the current being supplied to the such coils.

25. The process of claim 10, wherein electrical current to the coils in a control zone is provided by a control zone driver having switching means, which driver is connected to a control zone controller for switching means instructions, the driver providing rapid response current control by:

providing a high available voltage to the switching means;

sensing a current indicative of the current output by the switching means and determining the difference between the sensed current and a desired current level, and;

interrupting, based on said difference, the instruction for turning the switching means on to thereby regulate the current output of the driver to maintain the coil currents at the desired level.

26. A process of drawing a web of film in a tenter frame with independently propelled tenter clips including the steps of propelling such clips in opposed loops in paired symmetry using synchronous linear motors wherein synchronous secondaries are attached to the clips;

positioning a linear motor primary adjacent each loop; developing in each linear motor primary a plurality of electromagnetic waves that are coordinated in time in a precisely predetermined manner, with the electromagnetic waves on one loop matching the respective, opposed electromagnetic waves in the other loop; synchronously engaging the synchronous secondaries attached to the carriages with the electromagnetic waves to propel the carriages throughout the endless loops;

grasping the edges of the film with the tenter clips; and, drawing the film.

* * * * *